United States Patent
Zhu

(10) Patent No.: US 7,447,669 B2
(45) Date of Patent: Nov. 4, 2008

(54) METHOD AND SYSTEM FOR TIMETABLING USING PHEROMONE AND HYBRID HEURISTICS BASED COOPERATING AGENTS

(75) Inventor: Chunbao Zhu, Singapore (SG)

(73) Assignee: Nanyang Polytechnic, Singapore (SG)

( * ) Notice: Subject to any disclaimer, the term of this patent is extended or adjusted under 35 U.S.C. 154(b) by 511 days.

(21) Appl. No.: 11/211,460

(22) Filed: Aug. 26, 2005

(65) Prior Publication Data

US 2006/0184470 A1      Aug. 17, 2006

(30) Foreign Application Priority Data

Nov. 24, 2004    (SG)    ............... 200407221

(51) Int. Cl.
  *G06F 9/44*    (2006.01)
  *G06N 7/02*    (2006.01)
  *G06N 7/06*    (2006.01)
(52) U.S. Cl. ..................................................... 706/52
(58) Field of Classification Search ................. None
  See application file for complete search history.

(56) References Cited

U.S. PATENT DOCUMENTS

| | | | | |
|---|---|---|---|---|
| 5,070,453 | A * | 12/1991 | Duffany | 705/8 |
| 5,635,624 | A * | 6/1997 | Cerny | 73/12.01 |
| 6,055,512 | A * | 4/2000 | Dean et al. | 705/17 |
| 6,381,444 | B1 * | 4/2002 | Aggarwal et al. | 434/350 |
| 6,615,199 | B1 * | 9/2003 | Bowman-Amuah | 706/50 |
| 6,615,253 | B1 * | 9/2003 | Bowman-Amuah | 709/219 |
| 6,636,242 | B2 * | 10/2003 | Bowman-Amuah | 715/764 |
| 6,640,238 | B1 * | 10/2003 | Bowman-Amuah | 709/201 |
| 6,640,244 | B1 * | 10/2003 | Bowman-Amuah | 709/207 |
| 6,640,249 | B1 * | 10/2003 | Bowman-Amuah | 709/228 |
| 6,662,167 | B1 * | 12/2003 | Xiao | 706/13 |
| 6,715,145 | B1 * | 3/2004 | Bowman-Amuah | 718/101 |

(Continued)

OTHER PUBLICATIONS

Ant colony optimization for resource-constrained project scheduling Merkle, D.; Middendorf, M., Schmeck, H.; Evolutionary Computation, IEEE Transactions on vol. 6, Issue 4, Aug. 2002 pp. 333-346 Digital Object Identifier 10.1109/TEVC.2002.802450.*

(Continued)

*Primary Examiner*—Michael B Holmes
(74) *Attorney, Agent, or Firm*—Lawrence Y D Ho & Associates Pte Ltd

(57) ABSTRACT

The present invention provides a timetabling system based on an improved ant colony optimization using pheromone and hybrid heuristics based cooperating agents. The timetabling system can provide an optimal timetable solution for a timetable problem that consists of a plurality of activities, each activity being scheduled to a start time within a planning period and being allocated all required resources from a plurality of sets of resources. In one aspect of the present invention, the timetabling system comprises an electronic device having a memory capacity that contains a storage medium, and a timetabling module being implemented in the electronic device. The present invention also provides a timetabling method based on an improved ant colony optimization by using pheromone and hybrid heuristics based cooperating agents to obtain an optimal timetable solution for a timetable problem that consists of a plurality of activities, each activity being scheduled into a start time within a planning period and being allocated all required resources from a plurality of sets of resources.

29 Claims, 13 Drawing Sheets

U.S. PATENT DOCUMENTS

| | | | |
|---|---|---|---|
| 6,742,015 B1 * | 5/2004 | Bowman-Amuah | 718/101 |
| 6,782,302 B1 * | 8/2004 | Barto et al. | 700/101 |
| 6,801,819 B1 * | 10/2004 | Barto et al. | 700/99 |
| 6,834,229 B2 * | 12/2004 | Rafiah et al. | 701/201 |
| 6,842,906 B1 * | 1/2005 | Bowman-Amuah | 719/330 |
| 6,904,329 B1 * | 6/2005 | Barto et al. | 700/99 |
| 6,957,200 B2 * | 10/2005 | Buczak et al. | 706/13 |
| 6,996,601 B1 * | 2/2006 | Smith | 709/203 |
| 6,999,829 B2 * | 2/2006 | Bazzocchi et al. | 700/99 |
| 7,069,097 B1 * | 6/2006 | Barto et al. | 700/100 |
| 7,127,310 B1 * | 10/2006 | Barto et al. | 700/100 |
| 7,155,900 B2 * | 1/2007 | Colignon | 60/297 |
| 7,283,970 B2 * | 10/2007 | Cragun et al. | 705/8 |
| 7,289,964 B1 * | 10/2007 | Bowman-Amuah | 705/1 |

OTHER PUBLICATIONS

An Artificial Intelligence Approach to Course Timetabling Lien-Fu Lai; Nien-Lin Hsueh; Liang-Tsung Huang; Tien-Chun Chen; Tools with Artificial Intelligence, 2006. ICTAI '06. 8th IEEE International Conference on Nov. 2006 pp. 389-396 Digital Object Identifier 10.1109/ICTAI.2006.31.*

Interactive timetabling system using genetic algorithms Kanoh, H.; Sakamoto, Y.; Systems, Man and Cybernetics, 2004 IEEE International Conference on vol. 6, Oct. 10-13, 2004 pp. 5852-5857 vol. 6 Digital Object Identifier 10.1109/ICSMC.2004.1401129.*

System of automated timetabling Legierski, W.; Widawski, R.; Information Technology Interfaces, 2003. ITI 2003. Proceedings of the 25th International Conference on Jun. 16-19, 2003 pp. 495-500.*

Co-evolutionary algorithm approach to a university timetable system Chan, C.K.; Gooi, H.B.; Lim, M.H.; Evolutionary Computation, 2002. CEC '02. Proceedings of the 2002 Congress on vol. 2, May 12-17, 2002 pp. 1946-1951 Digital Object Identifier 10.1109/CEC.2002.1004541.*

Automated time table generation using multiple context reasoning for university modules Srinivasan, D.; Tian Hou Seow; Jian Xin Xu; Evolutionary Computation, 2002. CEC '02. Proceedings of the 2002 Congress on vol. 2, May 12-17, 2002 pp. 1751-1756 Digital Object Identifier 10.1109/CEC.2002.1004507.*

Solution of real-world train timetabling problems Caprara, A.; Fischetti, M.; Guida, P.L.; Monaci, M.; Sacco, G.; Toth, P.; System Sciences, 2001. Proceedings of the 34th Annual Hawaii International Conference on Jan. 3-6, 2001 pp. 10 pp.*

A software engineering approach to university timetabling Lee, J.; Yong-Yi Fanjiang; Lai, L.F.; Multimedia Software Engineering, 2000. Proceedings. International Symposium on Dec. 11-13, 2000 pp. 124-131 Digital Object Identifier 10.1109/MMSE.2000.897202.*

Heuristics for the exam scheduling problem Fu Zhaohui; Andrew Lim; Tools with Artificial Intelligence, 2000. ICTAI 2000. Proceedings. 12th IEEE International Conference on Nov. 13-15, 2000 pp. 172-175 Digital Object Identifier 10.1109/TAI.2000.889864.*

Another timetabling approach Falcao, P.; Pereira, M.; Ribeiro, R.; Barahona, P.; Expert Planning Systems, 1991., First International Conference on Jun. 27-29, 1990 pp. 212-216.*

* cited by examiner

|  | $t_1$ | $t_2$ | $t_3$ | $t_4$ | ... | $t_{Nt-1}$ | $t_{Nt}$ |
|---|---|---|---|---|---|---|---|
| $s_1$ | $t_{1,1}$ | $t_{1,2}$ | $t_{1,3}$ | $t_{1,4}$ | ... | $t_{1,Nt-1}$ | $t_{1,Nt}$ |
| $s_2$ | $t_{2,1}$ | $t_{2,2}$ | $t_{2,3}$ | $t_{2,4}$ | ... | $t_{2,Nt-1}$ | $t_{2,Nt}$ |
| $s_3$ | $t_{3,1}$ | $t_{3,2}$ | $t_{3,3}$ | $t_{3,4}$ | ... | $t_{3,Nt-1}$ | $t_{3,Nt}$ |
| ... | ... | ... | ... | ... | ... | ... | ... |
| $s_k$ | $t_{k,1}$ | $t_{k,2}$ | $t_{k,3}$ | $t_{k,4}$ | ... | $t_{k,Nt-1}$ | $t_{k,Nt}$ |
| ... | ... | ... | ... | ... | ... | ... | ... |
| $s_{Ns-1}$ | $t_{Ns-1,1}$ | $t_{Ns-1,2}$ | $t_{Ns-1,3}$ | $t_{Ns-1,4}$ | ... | $t_{Ns-1,Nt-1}$ | $t_{Ns-1,Nt}$ |
| $s_{Ns}$ | $t_{Ns,1}$ | $t_{Ns,2}$ | $t_{Ns,3}$ | $t_{Ns,4}$ | ... | $t_{Ns,Nt-1}$ | $t_{Ns,Nt}$ |

FIG. 3

METHOD AND SYSTEM FOR TIMETABLING USING PHEROMONE AND HYBRID HEURISTICS BASED COOPERATING AGENTS

FIELD OF THE INVENTION

The present invention generally relates to systems and methods for timetabling, and more particularly to a timetabling system and method using pheromone and hybrid heuristics based cooperating agents.

BACKGROUND OF THE INVENTION

Timetabling is a combinatorial optimization problem. The common examples of timetabling include school timetabling, sport game timetabling and transportation timetabling. The timetabling as a highly constrained and complex problem has been attracting the attention of the research community across Artificial Intelligence (AI) and Operational Research (OR) for more than four decades and still been heavily investigated as more and more experiences have been collected by the application of new technologies.

Various techniques have been employed for solving a wide range of timetabling problems. For example, graph coloring, integer programming and linear programming have been widely studied in the early days. However, these simple and easily implemented techniques are impractical for complex timetabling problems.

More lately, timetabling problems have been tackled by constraint programming and heuristics technologies such as Tabu Search, Simulated Anealing and Knowledge Based System approach. However, the timetabling problems are so complex that exhaustive search is often computationally intractable, thus the existing techniques and systems based upon a single and simple heuristic or algorithm often fail to provide optimal or near-optimal solutions.

Genetic algorithms have also been applied to timetabling problems. Briefly, the Genetic algorithms (GA) are based upon the principles of natural selection and evolution. In a GA system, solution of a problem is encoded in an artificial chromosome. Each unit of the chromosome, known as a gene, is a variable with a defined range of values. Genetic algorithms operate on a population of encoded solutions or chromosomes in a selection-reproduction evolution cycle. The first generation of a selection-reproduction evolution cycle consists of a number of randomly generated chromosomes, which are then selected according to a fitness quality. Selected fit members of the first generation are put into a mating pool for reproduction from which a new generation is derived by combining (crossover) or altering (mutating) genes among individuals within the population. The selection-reproduction evolution cycle repeats until an optimal solution is found or after a number of predetermined evolution cycles.

However, existing GA-based timetabling systems are not able to solve large and complex timetabling problems with a very large number of activities and/or too complex resource constraints. The reason may be that for a successful application of genetic algorithms, one of the conditions is that the chromosomes encoding the solutions must be within a manageable length. In most of cases, the number of genes in a chromosome must be within fifty to one hundred, or at most a few hundreds. However, the number of activities to be scheduled in an education institute can easily reach several thousands, wherein each activity may require multiple resources. Thus, each chromosome may contain a few thousand genes, sometimes even more than ten thousand genes. Therefore, the chromosomes required to encode a large and complex timetabling are too lengthy for a GA-based searching engine to manage.

Recently ant colony optimization (ACO) has been utilized for solving timetabling problems. Briefly, the ant colony optimization (ACO) algorithm is a meta-heuristic technique using of simple cooperating agents called artificial ants. The ants iteratively construct candidate solution to a combinatorial optimization problem. An individual ant constructs a candidate solution by starting with an empty solution, and then iteratively adds solution components, which is selected using local search heuristic and pheromone deposited, if any, until a complete candidate solution is generated. After the solution construction is completed, the ants give feedback on the solutions they have constructed by depositing pheromone on searching paths using global pheromone updating rules. Solution components that are better or partially better are used by more ants and therefore receive a higher amount of pheromone until an optimal solution is found.

M. Dorigo, and V. Maniezzo and A. Coloni initially deduced the ACO meta-heuristic in ant colony optimization by studying the behavior of real ants in establishing the shortest path from their colony to feeding sources and back. See, Dorigo et al., Ant System: Optimization by a Colony of Cooperating Agents, IEEE Trans. Sys., Man, Cybernetics 26(1): 29-41 (1996). Generally, an ACO meta-heuristic consists of three problem-solving steps. First, the optimization problem is defined into a graph. Second, a local searching heuristic is applied to select the next node for an ant to move to until the ant completes its solution construction. Finally, when all ants have constructed a complete solution, global pheromone updating rules are applied to update pheromone on links of visited nodes. The cooperating agents defined by M. Dorigo, et al, are basically pheromone-based cooperating agents, which communicate each other in the solution search cycles by utilizing the density of the pheromone deposited on the searching path.

The ACO meta-heuristic has been applied to solve various combinatorial optimization problems such as the traveling salesman problem (TSP) and tour routing problems. Although the ACO meta-heuristic with pheromone-based agents has been proven useful for solving some combinatorial optimization problems (COPs), it has not been successfully used in solving large and complex COPs, such as large and complex timetabling problems. The reason why the ACO meta-heuristic using pheromone based cooperating agents has not been successful in timetabling is because the solution searching method using pheromone based agents is simply based upon pheromone updating rules and formula, which are not sufficient to cope with the sizable solution space and multiple constraints imposed.

Recently, efforts have been made to solve scheduling problems using ACO or ant algorithms. For example, Socha et al. tried to use ant algorithms to solve university timetabling problem. See, Socha et al., "Ant Algorithms for the University Course Timetabling Problem with Regard to the State-of-the-Art", Proceedings of EvoCOP 2003-3rd European Workshop on Evolutionary Computation in Combinatorial Optimization, Springer-Verlag, vol. 2611, p334-345. (url=http://citeseer.istpsu.edu/socha03ant.html). However, since the searching agents used by Socha at el. were simple pheromone-based cooperating agents, the system developed by them could only solve small and simplified timetabling problem. Since the pheromone, which is the medium used for communication among cooperating agents, contains very limited information, agents must be given more intelligence in order to enable them to solve large and complex COPs, such as large and complex timetabling problems.

Besides the pheromone-based agents, currently autonomous agents and multi-agent systems (AAMAS) become one of the prominent and attractive technologies in AI and computer science community. The technologies, methods, and theories of the agents and multi-agent systems are a conceptual paradigm for analyzing problems, currently contributing to many diverse domains such as information retrieval, user interfaces, electronic commerce, robotics, computer mediated collaboration, computer games, education and training, ubiquitous computing, and social simulation. However, they are still very new and emerging technology, not ready for dealing with complexity and interactivity of the large timetabling problems. In particular, the decision-making and optimization methodologies of the autonomous agents and multi-agent systems, such as trust and utility manipulations, are still in research stage, not mature enough for industrial applications although efforts have been made to develop prototype systems which utilize autonomous agents to solve various combinatory optimization problems.

Therefore, there is an existing need for a method and system for complex timetabling problems. This invention satisfies this need by providing a method and system for timetabling that uses pheromone and hybrid heuristics based cooperating agents. The method and system of the present invention overcomes the limitations of the existing ACO method and ant systems in solving large complex timetabling problems by using more intelligent cooperating agents that combine pheromone density manipulation with hybrid heuristics. The intelligent cooperating agents could be able to solve large and complex timetabling problems as well as to optimize solutions by satisfying multiple constraints imposed and meeting multiple optimization criteria. Other advantages of this invention will be apparent with reference to the detailed description.

SUMMARY OF THE INVENTION

The present invention provides a timetabling system based on an improved ant colony optimization using pheromone and hybrid heuristics based cooperating agents. The timetabling system can provide an optimal timetable solution for a timetable problem that consists of a plurality of activities, each activity being scheduled to a start time within a planning period and being allocated all required resources from a plurality of sets of resources. In one aspect of the present invention, the timetabling system comprises an electronic device having a memory capacity that contains a storage medium, and a timetabling module being implemented in the electronic device. In one embodiment of the present invention, the storage medium stores the information of the timetable problem including the plurality of activities, the time slots within the planning period, and the plurality of sets of resources. In another embodiment of the present invention, the timetabling module comprises a source graph constructor for constructing the source graph for the timetable problem; wherein the source graph consists of a plurality of activity nodes representing the activities, a plurality of resource nodes representing the resources, and a plurality of time nodes that are associated with the plurality of resource nodes, thereby the plurality of resource nodes and the time nodes form a multi-resource-time-space, i.e., the source graph; and wherein the timetabling module comprises a timetable solution searching engine performing timetable solution searching cycles on the source graph to thereby determine an optimal timetable solution.

The present invention also provides a timetabling method based on an improved ant colony optimization by using pheromone and hybrid heuristics based cooperating agents to obtain an optimal timetable solution for a timetable problem that consists of a plurality of activities, each activity being scheduled into a time slot within a planning period and being allocated all required resources from a plurality of sets of resources. In one aspect of the present invention, the timetabling method comprises the steps of constructing a source graph having a plurality of activity nodes representing the activities, a plurality of resource nodes representing the resources, and a plurality of time nodes that are associated with the plurality of resource nodes, thereby the plurality of resource nodes and the time nodes form a multi-resource-time-space, i.e., the source graph; initializing one or more searching parameters for one or more searching agent; and performing timetable solution searching cycles on said source graph for each of said one or more searching agents to determine the optimal timetable solution.

There are many advantages in applying the present invention. One advantage of the present invention is that determining an optimal timetable solution using cooperating agents in a source graph having a large number of activity nodes and resource nodes which are associated with time space, is more efficient and more robust than using existing timetabling systems. Moreover, the invention has an advantage over existing timetabling system in that determining the optimal timetable solution is possible even though the timetabling problem is very complex and highly constrained. Another advantage of the present invention is that the timetabling system, the method, and the product overcome the limitations of the existing ACO meta-heuristic and algorithms to enable the improved ACO technology to solve large and complex timetabling problems.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

FIG. 3 is an exemplary matrix representation of time space associated with staff resource for a planning period.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides a timetabling system based on an improved ant colony optimization (ACO) using pheromone and hybrid heuristics-based cooperating agents and a method of determining an optimal timetable solution using the timetabling system. In the following description, details are provided to describe the preferred embodiments. It shall be apparent to one skilled in the art that the invention may be practiced without some of these details. In the meantime, the technical details known to those skilled in the art will not be described in length so as not to obscure the invention.

Figure 1:
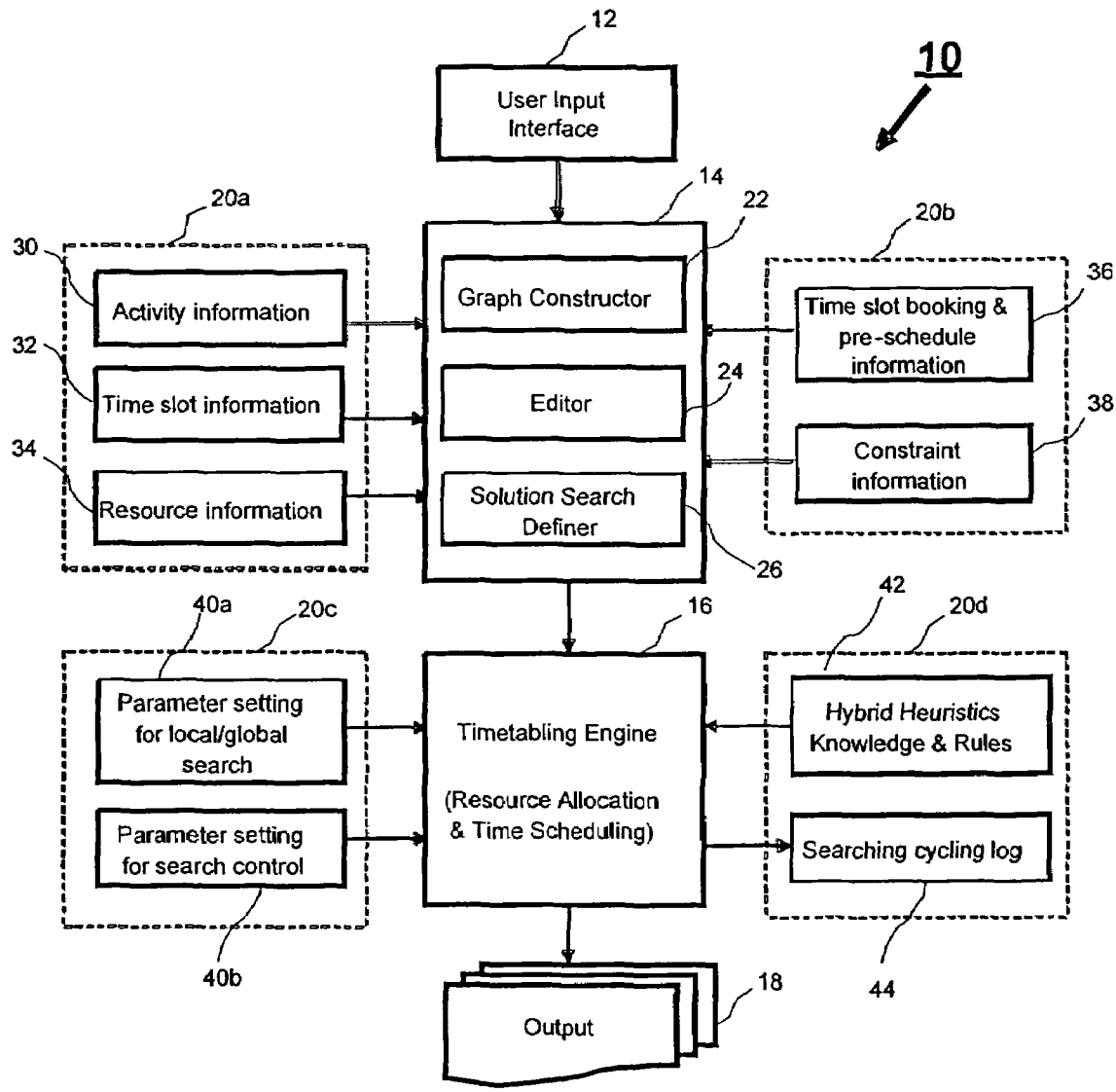
FIG. 1 is a functional block diagram of a timetabling system based on an improved ACO using pheromone and hybrid heuristics based cooperating agents in accordance with the present invention

Now referring to FIG. 1, there is provided a timetabling system 10 in accordance with one preferred embodiment of the present invention. FIG. 1 shows a functional block diagram of the timetabling system 10 based on ACO using pheromone and hybrid heuristics based cooperating agents. The timetabling system 10 comprises a timetabling module that comprises a graph generator 14, and a timetabling engine (resource allocation and time scheduling) 16. The timetabling system 10 also comprises a storage medium including different parts 20a, 20b, 20c and 20d. The storage medium stores all the information required by the timetabling module so that the graph generator 14 can generate a source graph on which the timetabling engine 16 searches for an optimal timetable solution 18. It is to be appreciated that the different data stored in different parts of the storage medium as shown in FIG. 1 is only for the purpose of illustration. The storage medium may be any electronic devices with memory capacities. Output of the timetabling module is the optimal timetable solution 18 which contains a list of activities, where each activity has been scheduled to a start time within a planning period and allocated with required resources. The optimal timetable solution 18 may be printed by a printer connected to or displayed on a screen associated with a computer system shown in FIG. 13 discussed in detail hereinafter. In addition, the timetabling system 10 comprises a user input interface 12 that allows the user to input information that specifies a timetabling problem such as details of activities, resource requirements, constraints, and one or more optimization criteria for the optimal timetable solution.

The graph generator 14 comprises a virtual source graph constructor 22, an information editor 24, and a solution search definer 26. The information editor 24 includes an activity node editor, a resource node editor, a time space or timeslot editor, a constraint & weight factor editor, and a timetable solution optimization criterion editor. As shown in FIG. 1, the graph generator 14 couples to the storage medium 20a and 20b to generate a virtual source graph on which the cooperating agents search for timetable solutions. The virtual source graph comprises the information from the storage medium 20a of a list of activities 30, a list of time slots 32, and a list of the categorized resource nodes 34, wherein each resource node is associated with a time space represented by the list of time slots 32. The virtual source graph also contains various pre-scheduled information 36 and other constraint information 38. The generation of the virtual source graph will be described in detail hereinafter.

The solution search definer 26 defines the timetable solution searching problem. For example, it specifies what are the activities to be scheduled, and what are the constraints that are to be imposed during timetable solution searching.

The timetabling engine 16 is an improved ACO-based search engine that uses pheromone and hybrid heuristics baaed cooperating agents to search the virtual source graph for possible timetable solutions from which the optimal timetable solution is then determined. Other required information for searching of the possible timetable solutions may include control parameter settings 40a, 40b stored in the storage medium 20c. These control parameter settings 40a, 40b are for local searching, global searching, and search control and include, for example, the number of cooperating agents and the number of timetable solution searching cycles. The timetable solution searching cycles performed by the timetabling engine 16 are recorded and stored in the storage medium 20d in the searching cycling log 44. The cycle log 44 enables tracking of control parameter settings associated with the source graph and graph clusters that were constructed by the graph generator 14. The knowledge and rules of the hybrid heuristics are also stored in the storage medium 20d.

Figure 2:
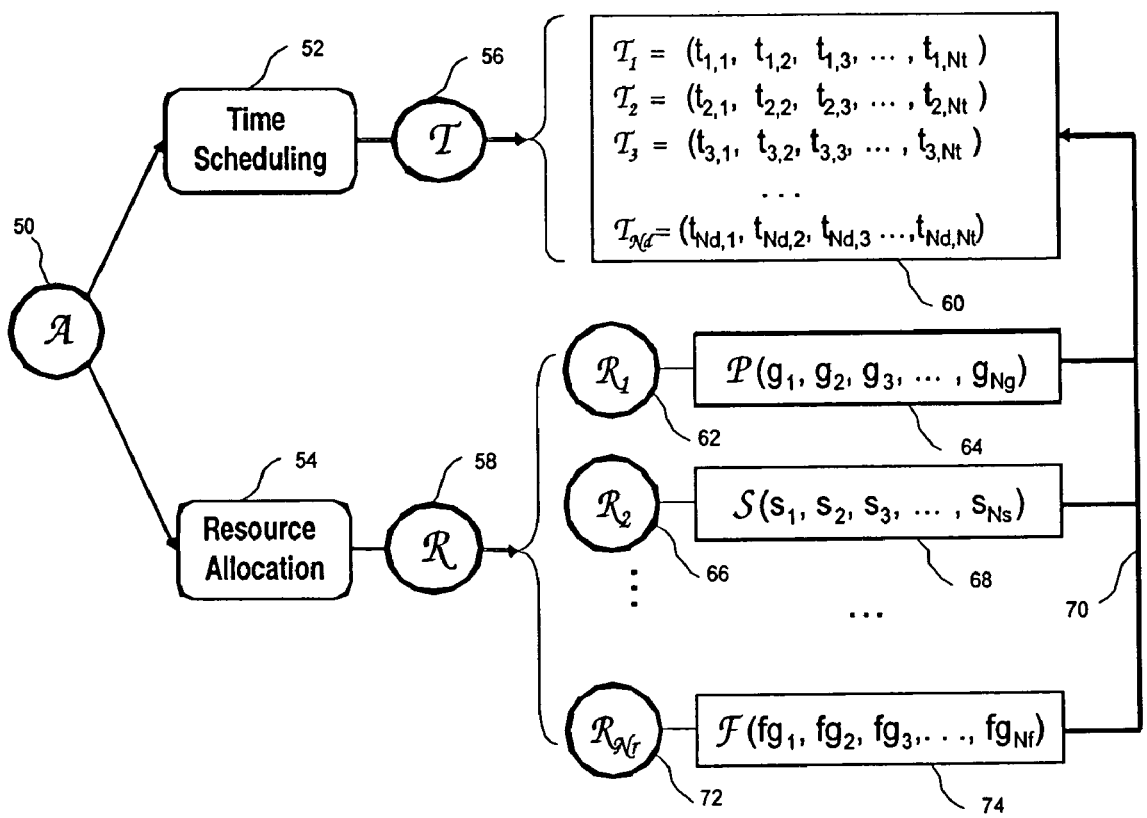
FIG. 2 illustrates a timetabling problem that consists of a time scheduling problem with time spaces and a resource allocation problem with resources.

For a better understanding of the principles of the present invention, there is provided a simplified illustration of a timetabling problem. As shown in FIG. 2, the timetabling problem is defined as searching of an optimal solution for a set of activities 50. The optimal solution provides a proper start time for each activity by time scheduling 52 and satisfies all resource constraints for each activity by resource allocation 54. In a simple format as shown in FIG. 2, the timetabling problem is one that a set of activities A, 50, where A={$a_1$, $a_2$, $a_3$, . . . , $a_n$}, are to be scheduled 52 within a fixed period of time 60 (referred as the planning period thereafter), and at the same time each activity is to be allocated 54 with one or more resources 58 that are required by the activity. In practice, various constraints are imposed to the time scheduling and resource allocation, which are not shown in FIG. 2 but will be described in detail later on.

For a timetabling problem, an activity, $a_k$ (k=1 to n, where n is the number of activities), may be any subject matter including a lesson, a sport event, a seminar or any other event with time and resource constraints. The activity may take place during a fixed period of time (referred as duration thereafter) within the planning period. For example, the planning period for a weekly repeating timetable for an educational institute may be a week, and a lesson as a teaching activity may last for two hours. The resources in a timetabling problem may also present in different forms including human resources and equipment resources.

Still referring to FIG. 2, the planning period 60 consists of a plurality of discrete time slots $(t_{1,1}, t_{1,2}, \ldots, t_{Nd, Nt})$, where $N_d$ represents the total number of days $(T_1, \ldots T_{Nd})$ within the planning period, and where $N_t$ denotes the total number of discrete timeslots within each day $(t_{k,1}, t_{k,2}, \ldots, t_{k, Nt}, k=1$ to $N_d)$ of the planning period. As shown in FIG. 2, the resources 58 consists of a plurality of sets of resources $(R_1$ 62, $R_2$ 66, ..., $R_{Nr}$ 72), where $N_r$ denotes the number of the sets of the resources. The subjects within any set of resources may be defined by a user in any manner. For example, human resources including all personnel may be categorized into different sets such as a set of participates $R_1$ 62 ($P(g_1, g_2, g_3, \ldots, g_{Ng})$) 64, and a set of training staff $R_2$ 66 ($S(s_1, s_2, s_3, \ldots, S_{Ns})$ 68. By the same token, the facility resource $R_{Nr}$ 72 may be grouped into venues where the activity $a_k$ takes place, or one or more pieces of equipment that are required by the activity $a_k$, e.g., $F(fg_1, fg_2, fg_3, \ldots, fg_{Ng})$ 74. Furthermore, the resources 58 are meaningful for a timetabling problem only when they are related 70 to time space 56. The relation between the time space and the resources will be discussed in detail hereinafter.

For a timetabling problem, the resources may be divided into two categories based on their interchangeability: discrete resources and unary resources. The discrete resources refer to ones that are similar to each other and interchangeable. For example, tutorial rooms with the same seating capacity and functionality are typical examples of discrete resources. The unary resources refer to ones that are unique and not interchangeable with each other. For example, if a computer Lab A is equipped with some special software which is not installed in any other computer labs in the organization concerned, the computer Lab A is unary resource and is not interchangeable with other computer labs.

In order to construct a virtual source graph of a timetabling problem, the resources must first be related to time spaces to form resource-time spaces. Referring now to FIG. 3, there is provided a staff-time space in form of a matrix 80 as an exemplary representation of resource-time spaces. The staff resource $S_k$ 82 represents staff k (k=1 to $N_s$, where $N_s$ is the number of staff resources). The resource $S_k$ 82 is associated with its time space represented by horizontal rows in the matrix 80. Each row of the matrix 80 consists of $N_t$ time slots, from $t_1$ 84 to $t_{Nt}$ 86. The value of an element in the time space matrix 80 represents the status of the time space utilization for a specific resource indexed by k (where k=1 to Ns). For example, value of the element at $(t_{k, Nt})$ 88, can be 0, 1 or 2, where the value of 0 means that the staff resource $S_k$ at time $t_{Nt}$ is available, value 1 means that the resource $S_k$ at time $t_{Nt}$ is allocated to an activity already, and 2 means that the time $t_{Nt}$ for resource $S_k$ is booked.

Figure 4:
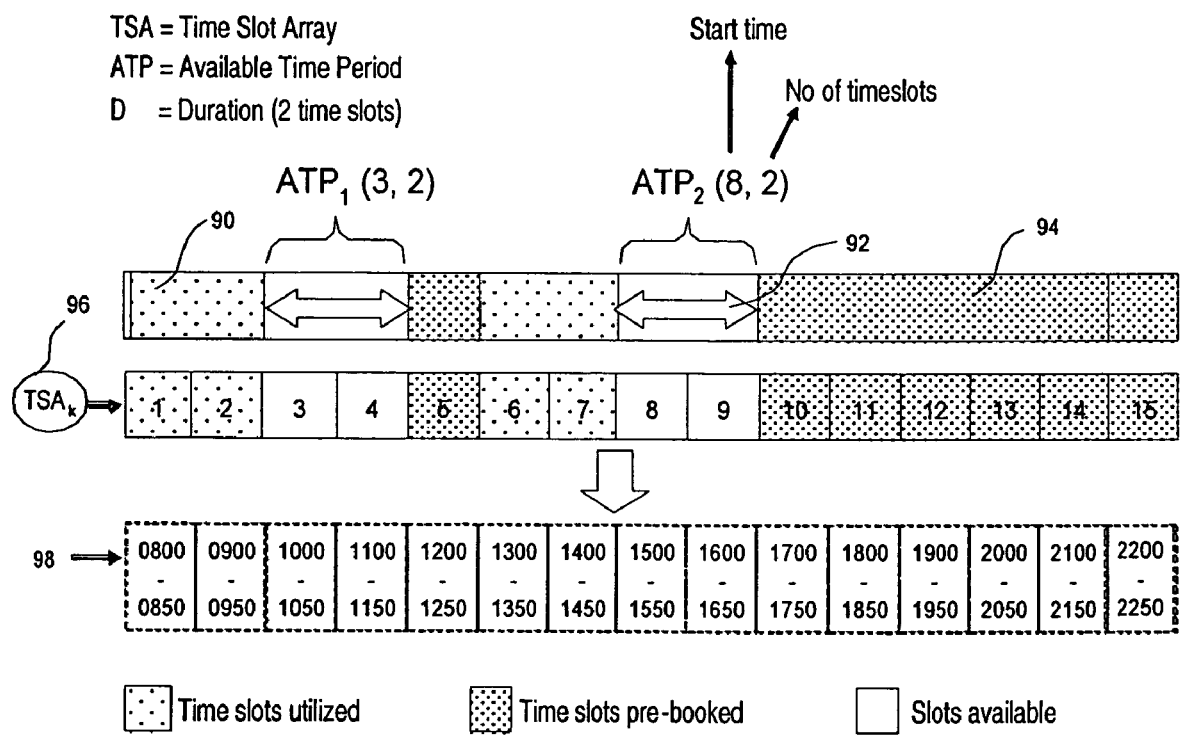
FIG. 4 illustrates a time slot array (TSA) representing the time spaces shown in FIG. 3, and how the TSA is mapped to real time as well as the definition of the available time period (ATP) for an activity.

In a timetabling model, the planning period can be represented in the form of arrays of discrete integer numbers, each integer number which is refereed as time slot thereafter, can then mapped into real time. As shown in FIG. 4, the sub-resource-time space for staff $S_k$ 82 in FIG. 3 is represented in form of the time slot array (TSA) notated as $TSA_k$ 96 that contains a list of discrete integer numbers from 1 to 15 (where $t_{Nt}=15$). The integer numbers in $TSA_k$ 96 can be mapped into real time 98 in a day. For example, the first time slot is mapped to a real time period of 0800-0850 and the second is mapped to 0900-0950. It is noted that the time mapping can be specified by the user. It is assumed that an activity $a_k$ has a fixed duration (D) $D_k$, e.g., $D_k=2$ time slots. In the FIG. 4, the scheduled time slots are marked using spare dots 90, e.g., Slot 1, Slot 2 and Slot 6 and Slot 7; the time slots booked are marked using dense dots 94, e.g., Slot 5 and Slots 10 to 15. Thus, two available time periods (ATPs) can be found for activity $a_k$, e.g., $ATP_1(3,2)$ and $ATP_2(8,2)$ 92. In $ATP_2(8,2)$, 8 represents the start time, and 2 represents the duration of the activity $a_k$.

As mentioned above, an activity to be scheduled may require multiple resources. Now referring to FIG. 5, there is provided a description of construction of multi-resources-time space graph for one activity. The activity $a_k$ 100 requires several sets of resources $R_1$ 102, $R_2$ 104, ..., and $R_{Nr}$ 106. It is assumed that the set of resource $R_1$ 102 consists of participant groups, $g_1$ 114a, $g_2$ 114b, ..., and $g_{Nak}$ 114x, the set of resource $R_2$ 104 consists of two staff resources, namely $s_1$ 116a, and $s_6$ 116b, and the set of resource $R_{Nr}$ consists of two types of facility resources $fg_1$ 110, and $fg_k$ 112. Furthermore, the facility resource group $fg_1$ 110 consists of two specific facility resources $f_1$ 118a, and $f_4$ 118b, and the facility resource group $fg_k$ 112 consists of one specific facility resource $f_k$ 118c.

Figure 5:
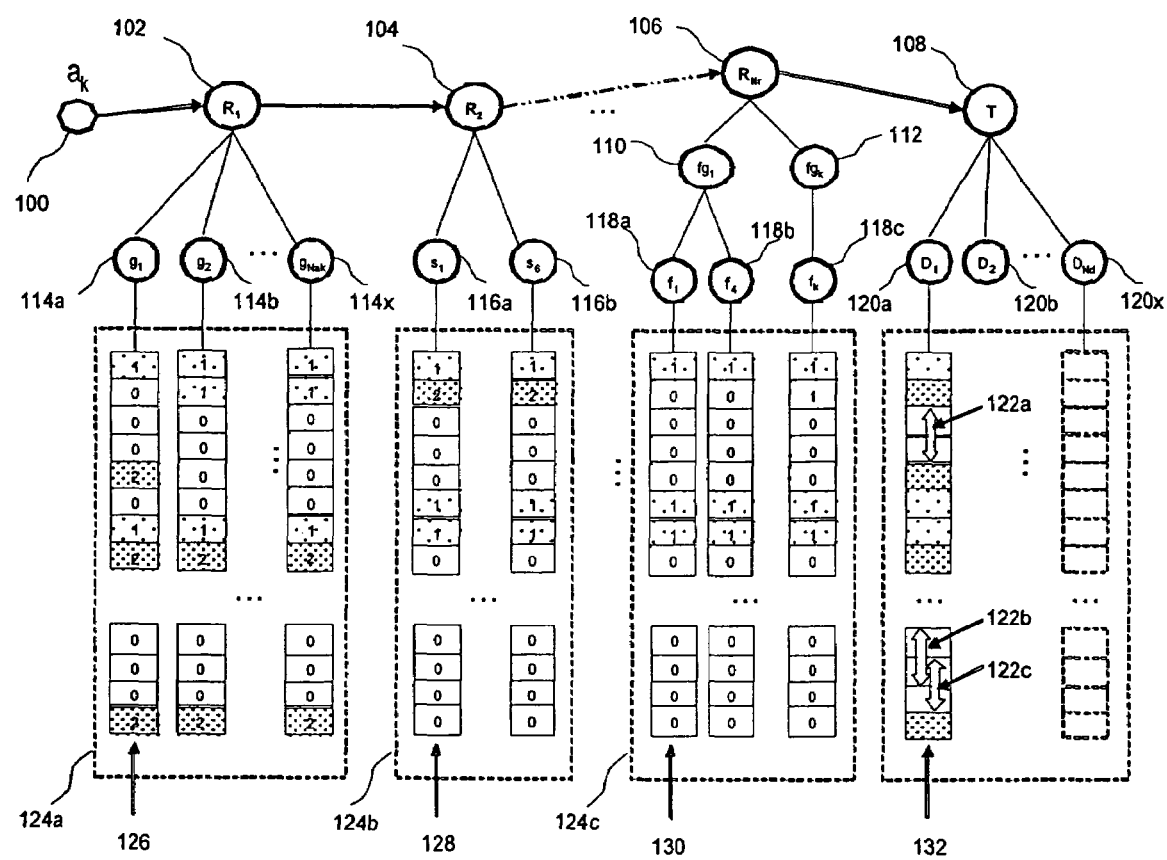
FIG. 5 shows a partial exemplary source graph constructed by the graph constructor of the timetabling system of FIG. 1, wherein the source graph is constructed for activity $a_k$, with required resources and associated with time spaces.

As also shown in FIG. 5, the resources required by the activity $a_k$ 100 are associated with time spaces 124a, 124b, 124c. The time space associated with each specific resource is represented in form of an integer array, e.g., TSA in FIG. 4. For example, the resource $g_1$ 114a is associated with the TSA 126, the staff resource $s_1$ 116a is associated with the TSA 128, and the facility resource $f_1$ 118a is associated with the TSA 130. To simplify the problem, FIG. 5 displays the TSAs showing ATPs only in $D_1$, which is for illustration purpose only. In real life problem-solving, the TSA should cover all the time slots during the whole timetable planning period, e.g. from $D_1$ to $D_{Nd}$. For the optimal solution search for a timetabling problem, the ATPs need to be combined into a final consolidate common TSA 132 from which the common available time period (CATP) can be analyzed. The CATP is defined as a minimum time period that equals to the duration of an activity and provides all required resources for the activity. When the duration of an activity is smaller than one combined ATP, it is possible to have more than one CATP. For example, if the duration of an activity is 2 time slots and one ATP has three time slots, there will be two CATPs for the activity in this combined ATP. FIG. 5 shows the CATPs 122a, 122b, and 122c. Thus, an exemplary multi-resources-time space graph for the activity $a_k$ 100 is shown in FIG. 5.

Figure 6:
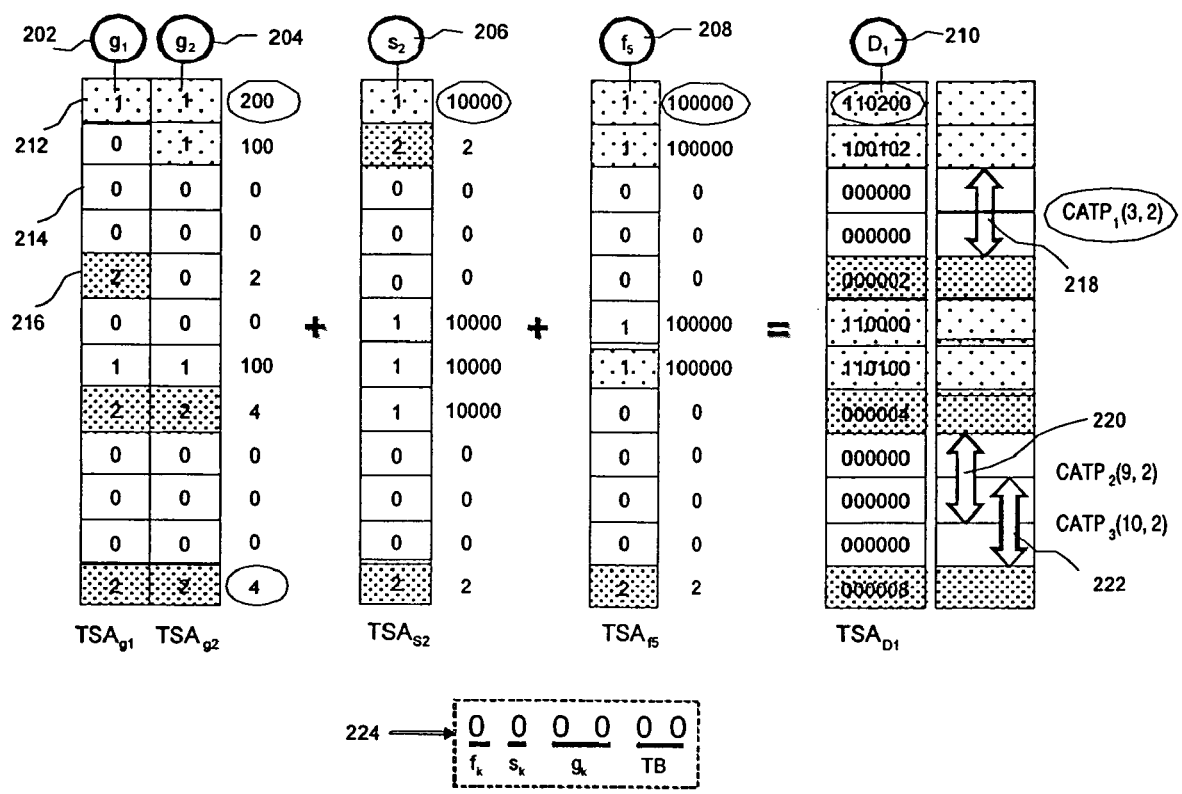
FIG. 6 illustrates manipulation of the time slot arrays (TSAs) and finding common available time periods (CATPs) for an activity.

Now there is provided more details of manipulation of the CATPs of a partial resource-time space as shown in FIG. 6. A six digit combinational string 224 is used to store the results of analysing common available time periods. The first digit from left is used to record time slot utilization status of facility resource $f_5$ 208. The second digit from left is used to record time slot utilization status of the staff resource $s_2$ 206. The next two digits are used to record time slot utilization status of participant groups $g_1$ 202 and $g_2$ 204. And the last two digits are used to store time booking of all resources.

The status of every time slot utilization in the resource-time space is marked with a number of 0, 1 or 2, representing for an activity of an available time slot 214, a scheduled time slot 212, and a booked time slot 216 respectively. According to this definition, the first time slots for resources $g_1$ 202 and $g_2$ 204 are utilized in a timetable schedule, e.g., the values of the first elements of $TSA_{g1}$ and $TSA_{g2}$ are 1, therefore, the analyzing result for resources $g_1$ 202 and $g_2$ 204 utilization is an integer number 200, e.g., $(1+1)\times100=200$. Similarly, analyzing result for the resource $s_2$ 206 utilization is $1\times10,000=10,000$; and the analyzing result for the resource $f_5$ 208 utilization is $1\times100,000=100,000$. The booked time slots represented by integer number 2, are simply summarized, for example the utilization status values in the last elements of $TSA_{g1}$ and $TSA_{g2}$ are 2, the summarized value is 2+2=4.

Finally, the analyzed results are consolidated into a common time slot array $TSA_{D1}$ for $D_1$, 210 in FIG. 6. It can be found that there are three CATPs, e.g., $CATP_1(3,2)$ 218, $CATP_2(9,2)$ 220, and $CATP_3(10,2)$ 222. The search agents will decide which CATP will be chosen for the activity concerned. It is to be appreciated that a CATP may be represented by other applicable methods.

Figure 7:
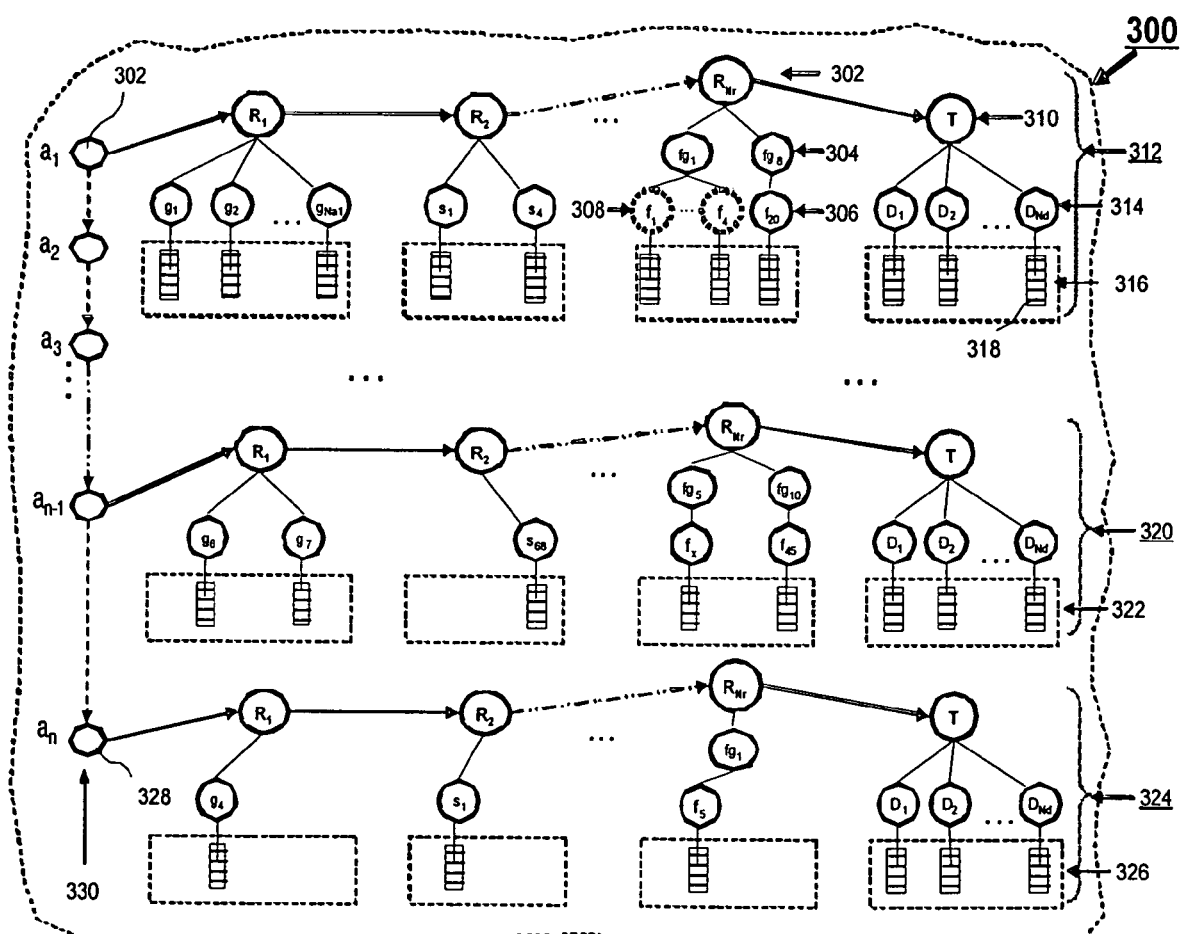
FIG. 7 shows an exemplary source graph constructed by the graph constructor of the timetabling system of FIG. 1.

After a multi-resource-time space graph for every activity of a timetabling problem has been constructed, a virtual source graph for the timetabling problem may be created. FIG. 7 shows an exemplary source graph (G) 300 constructed by the graph constructor 22 of the timetabling system 10 shown in FIG. 1. For this source graph 300, G=(A, T, R, Cl)

where:

A=a set of activity nodes of the source graph 300;

T=a set of time slots representing time-space of the source graph 300;

R=a set of resource nodes of the source graph 300;

Cl=a set of possible assignment clusters of the source graph 300.

Still referring to FIG. 7, in the graph 300, each activity node is linked to Nr resources set nodes. Further, taking activity $a_1$ as an example, $a_1$ requires several participate groups $g_k$, where k=1, 2, ..., $N_{a1}$, note that $g_k \in R_1$. Similarly, activity $a_1$ requires two staff resources $s_k$, where k=1 and 2, note that $s_k \in R_2$. All the nodes, including resource nodes, and time nodes, which are related to activity $a_1$, are constructed into a graph cluster 312 denoted as $GCL^{ak}$, where k=1 for activity $a_1$. The graph cluster $GCL^{a1}$ 312 contains a list of possible assignment clusters, where Cl denotes all the possible assignment clusters of the source graph 300.

As can be seen from the graph cluster $GCL^{a1}$ 312 in FIG. 7, unlike staff resources and participant groups resources, the facility resources have three layers. Layer I is resource set node $R_{Nr}$ 302; the second layer, Layer II consists of resource type nodes ($fg_1$, $fg_8$) 304; the last layer, e.g., Layer III, consists of the specific resource nodes ($f_1$, ..., $f_4$, and $f_{20}$) 306. Because all facility resources are categorised under their correspondent resource types, when specifying resource requirements for an activity, say $a_1$ 302, the planner must specify a resource type first, for example such as $fg_8$ in FIG. 7.

It is assumed that there are four discrete resources, namely $f_1$, $f_2$, $f_3$, and $f_4$, which are listed under resource type node $fg_1$. For discrete resources, the resource type specified $fg_1$ is sufficient for the scheduling engine to allocate one required resource among $f_1$, $f_2$, $f_3$, and $f_4$, because they are interchangeable. The dotted node circles, $f_1$ to $f_4$ mean the activity $a_1$ just requires one of them. For example, typically any one of the tutorial rooms, which have same eating capacity and same functionality, can be allocated to activity $a_1$.

However, for unary resources, the planner must specify both resource type node $fg_8$ 304 at layer II and resource node $f_{20}$ at layer III 306, because there might be a number of resource nodes, say $f_{20}$, $f_{21}$, $f_{22}$, and $f_{23}$ under the unary resource type node $fg_8$ 304 at Layer II, and the scheduling engine does not know which resource node should be used as they are not interchangeable.

In the source graph 300, the time slot node T 310 consists of $N_d$ days 314, wherein each day is associated with a list of time slots 318. For a weekly repeating timetable, the number of days, $N_d$ 314, is the number of working days in a week.

Still referring to FIG. 7, each resource node is associated with a time space. The time space is represented in form of integer matrixes, which will store the information of resource utilization status illustrated previously in FIGS. 4, 5 and 6. For example, the activity $a_1$ is associated with an integer time matrix 316; $a_{n-1}$ with an integer time matrix 322, and $a_n$ with an integer time matrix 326.

The graph constructor 22 of the timetabling system 10 will construct the source graph 300 when all the necessary information is known. The graph 300 consists of n graph clusters $GCL^{ak}$ (k=1 to n) as shown in FIG. 7. Each graph cluster is associated with an activity, and contains the activity node $a_k$, (k=1 to n) and its required resource nodes as well as its associated time space. For example, the graph cluster 312 for the activity $a_1$, denoted as $GCL^{a1}$, is constructed according to the given activity information, resource requirements and planning period. Similarly the other two clusters 320, 324, denoted as $GCL^{an-1}$ and $GCL^{an}$ respectively, are constructed for the activity node $a_{n-1}$ and activity node $a_n$ respectively.

It is noted that although every graph cluster in the source graph has its own time space, which is associated with the resource nodes and related to that particular activity, there is only one unique resource-time-space in the timetabling system 10 as shown in FIG. 1. For example, from the staff resource-time-space 80 as shown in FIG. 3, it is apparent that any other staff resource-time-space displayed in the graph 300 is only a repeated duplication of part of the center staff resource-time-space 80. Same concepts apply to the participant-group resources and the facility resources as well.

As shown in the source graph 300, the n activity nodes are listed from $a_1$ to $a_n$ 330. All activity nodes are ranked in such a sequential order that the activity demanding the most resources will be scheduled first, and the activity demanding the least resources will be scheduled last. Thus, a simple but useful heuristic applies, e.g., the most difficult activity will be scheduled first. The position of an activity in the ranked list depends upon both the activity's resource demands and time-space utilization.

Figure 8:
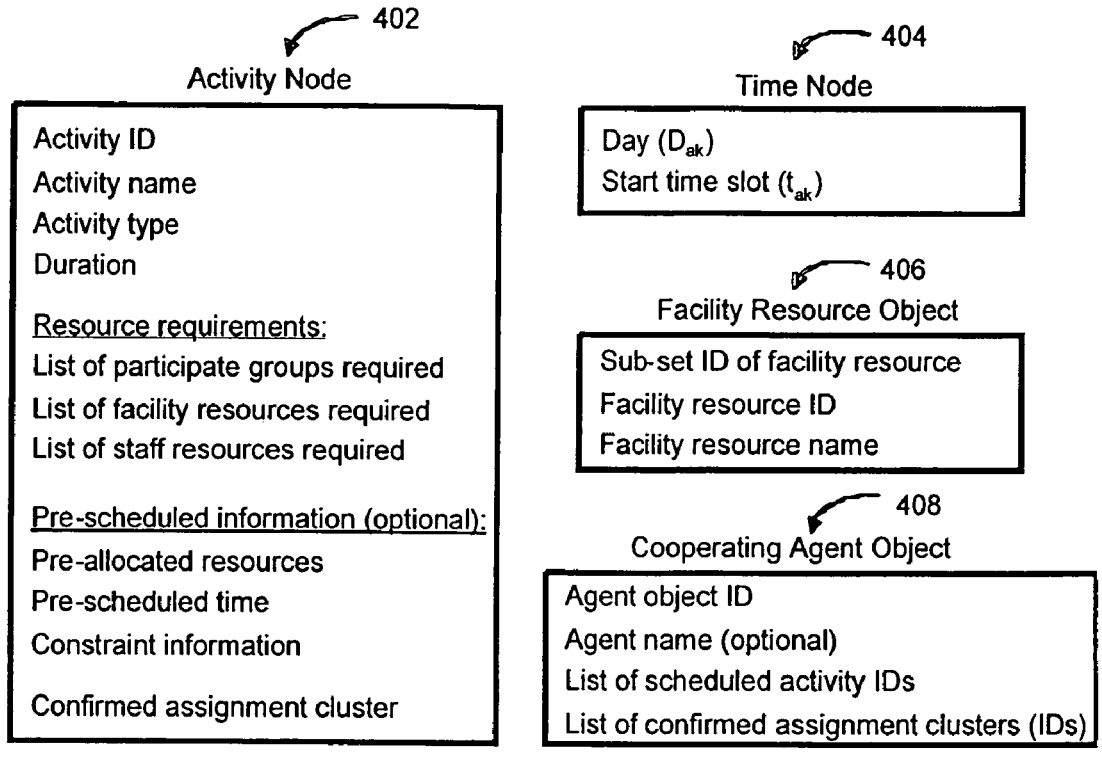
FIG. 8 illustrates definition of the activity node, time node, facility resource object, assignment cluster and possible assignment clusters of the timetabling system of FIG. 1.
Figure 8:
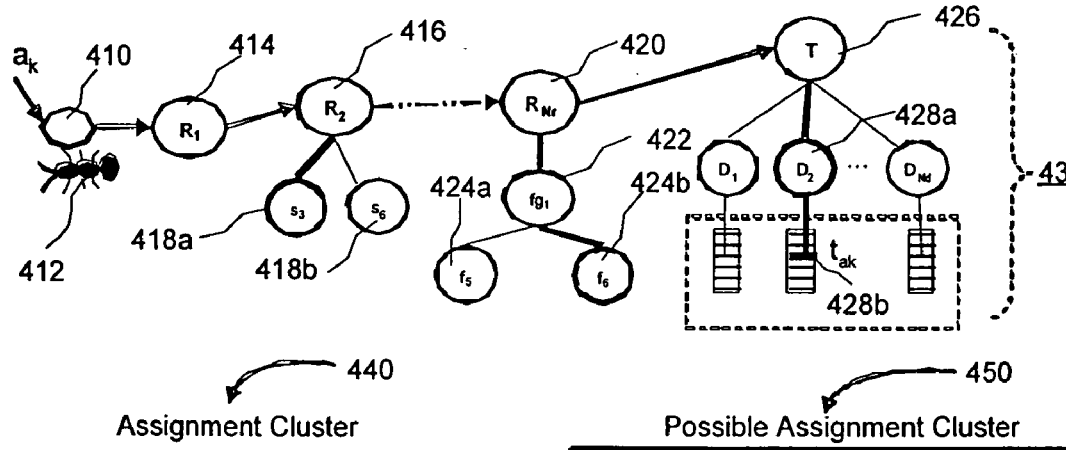

Now there is provided more detailed description of the activity node and time node in a source graph. Referring to FIG. 8, the activity node 402, representing a typical activity node 302 of the source graph 300 as shown in FIG. 7, contains information such as activity ID, activity name, type and duration. The duration is an integer number that represents the number of time slots during which the activity takes place.

The activity node 402 also contains resource requirements such as a list of participant groups required, a list of the staff resources required, and a list of facility resources required. The staff resources and participant groups are normally prefixed as they are decided before the timetable solution searching being carried out according to the activity nature and staff work load.

For the facility resources, the sub-set ID of the facility resources required must be specified. For unary resources, the planner must further specify a detailed facility resource, e.g., the facility resource ID and name. However, for discrete resources, the planner only needs to specify the number of resources required in the said sub-set of the facility resources required, normally the required number of facility resources is one, but occasionally it can be more than one. The timetable-scheduling engine will allocate the required number of discrete resources for the activity concerned. It is noted that the list of facility resources required consists of one or more facility resource objects 406. As shown in FIG. 8, the facility resource object 406 contains information such as the sub-set ID of facility resource (e.g., $fg_1$, $fg_2$, ..., or $fg_{Nf}$ 74 shown in FIG. 2), the facility resource ID (e.g., $f_1$, ..., or $f_4$ 308 shown in FIG. 7), and facility resource name that representing a specific resource listed in the said sub-set of facility resources.

The activity node 402 may optionally contain the pre-scheduled information because the planner may pre-allocate resources for an activity, and/or pre-fix start time for the activity. The pre-scheduled information includes pre-allocated resources, pre-scheduled time, constraint information and confirmed assignment cluster. As for the constraint information, the planner may impose specific constraints to an activity. For example, the activity $a_b$ should be conducted before activity $a_h$, which is also called temporal constraints. It is noted that the constraints included in the activity object 402 are specific to this activity only. The generic constraints, which are imposed to all the activities, are stored in a common storage 38 shown in FIG. 1. Details of these generic constraints are described as follows.

Complexity of a timetabling problem largely depends upon the size of the problem and the constraints imposed to the problem. There are basically two types of constraints: 1) hard constraints and 2) soft constraints. A timetable solution must satisfy all hard constraints; otherwise it is not an acceptable solution. Typical hard constraints imposed on a timetabling problem are listed below:

1.) No participant attends more than one activity at the same time;

2.) No instructor or training staff teaches more than one lesson at the same time;

3.) No facility resource is allocated to more than one activity at the same time.

The above hard constraints demand that an acceptable timetable solution must not have any timetable collisions among resources allocated for activities; otherwise the solution is not acceptable. One may impose more hard constraints on a timetabling problem but it is not encouraged to impose too many hard constraints as they certainly increase complexity of the problem, making solution searching difficult and likely generating timetable collisions.

Soft constraints are sort of preferences and requirements. Unlike hard constraints, it is better to satisfy soft constraints. However, it is allowed that the soft constraints imposed are only partially satisfied without making a solution unacceptable. Many timetabling problems are more naturally described via preference rather than hard statements. It is important to find the preferred solution according to preference criteria. Therefore, solving soft constraints becomes an optimization task. Sometimes optimization becomes multi-objectives, which makes the problem-solving process even more complex. To work out an optimal solution, sometimes, some soft constraints have to be relaxed. The computer software system has to be intelligent enough to decide when, how, and to what extent soft constraints should be relaxed.

Take school timetabling as an example, there are many soft constraints imposed to the timetabling problem. Following are some typical ones:

1) Student attending a later class in the evening should not have an early morning class on next day;

2) For any subject, lecture classes should be conducted before lab or tutorial sessions;

3) Every teaching staff should have one day off during a week;

4) Same classes with different student groups should be scheduled at different time;

5) There should not be too large empty gap between lessons for same group of students;

6) If possible, avoid early class in the morning;

7) Student study hours should be evenly distributed during the given planning period;

8) Minimize students and teaching staff movement between class transition periods; and 9) Maximize utilization of the facility resources.

The constraints listed above are to be evaluated during local searching and global solution evaluation. More detailed descriptions will be given in the descriptions of FIG. 9 to FIG. 12.

Still referring to FIG. 8, the time node 404 contains information including day $D_k$ (k=1 to D) and time slot $t_s$ (s=1 to $N_{dt}$, where $N_{dt}$ is the number of time slots in a day).

According to the resource requirements specified in the activity node 402, the graph generator 14 shown in FIG. 1 will retrieve all the required resource data from a center resource pool R 58 shown in FIG. 2 to create a graph cluster 430 shown in FIG. 8, denoted as $GCL^{ak}$, (k=1 to n), which represents the timetabling problem for said activity in form of graph.

The timetabling system 10 can then select one or more resources among the resource nodes represented in the graph cluster 430, denoted as $GCL^{ak}$, where the superscripted $a_k$ denotes that the graph cluster is associate with the activity $a_k$. A list of the resources assigned and time node selected form an assignment cluster 440, denoted as $ACL^{ak}$. The assignment cluster $ACL^{ak}$ 440 contains the information such as activity ID, possible assignment cluster ID chosen, the multiple resource nodes selected and time node determined.

As shown in FIG. 8, however, the graph cluster $GCL^{ak}$ 430 consists of various possible combinations of resource assignments that can be derived according to the resource requirements specified in the activity node 402. For example, at the virtual node $R_1$ 416, either $s_3$ 418a or $s_6$ 418b can be selected if only one staff resource is required. Similarly, at the facility group node $fg_1$ 422, either $f_5$ 424a or $f_6$ 424b can be selected if only one facility resource is required. A possible assignment cluster includes information such as activity ID, possible assignment cluster ID, list of possible resources nodes, and trail density. The possible assignment cluster 450 as shown in FIG. 8 is denoted as $PACL^{ak}_j$, where j=1 to $N^{ak}_p$, and where the $N^{ak}_p$ is the number of possible assignment clusters embedded in the graph cluster $GCL^{ak}$ 430. There are four possible assignment clusters embedded in the graph cluster $GCL^{ak}$ 430, as listed below.

$$\left. \begin{array}{l} PACL^{ak}_1 : a_k \to R_1 \to R_2 \Rightarrow s_3 \to R_{Nr} \Rightarrow fg_1 \Rightarrow f_5 \to T \Rightarrow (D_{akc1}, t_{akc1}) \\ PACL^{ak}_2 : a_k \to R_1 \to R_2 \Rightarrow s_3 \to R_{Nr} \Rightarrow fg_1 \Rightarrow f_6 \to T \Rightarrow (D_{akc2}, t_{akc2}) \\ PACL^{ak}_3 : a_k \to R_1 \to R_2 \Rightarrow s_6 \to R_{Nr} \Rightarrow fg_1 \Rightarrow f_5 \to T \Rightarrow (D_{akc3}, t_{akc3}) \\ PACL^{ak}_4 : a_k \to R_1 \to R_2 \Rightarrow s_6 \to R_{Nr} \Rightarrow fg_1 \Rightarrow f_6 \to T \Rightarrow (D_{akc4}, t_{akc4}) \end{array} \right\} \quad (1)$$

In the above listed four possible assignment clusters (1), several notations are used. The symbol $\Rightarrow$ is the assignment operator; the symbol→is searching path indicator; $PACL^{ak}_z$ denotes the zth possible assignment cluster in the graph cluster $GCL^{ak}$ that is associated with activity $a_k$, where z=1 to 4 in this particular situation. The node in bold is a variant node, such as $s_3$, $s_6$, $f_5$ and $f_6$, while other nodes have already assigned with known values.

It is noted that if for example the facility resource is prefixed with a value of $f_6$, then the possible assignment clusters $PACL^{ak}_1$ and $PACL^{ak}_3$ containing the element of facility resource $f_5$ must be removed from the list because it is not legal to assign another value, say $f_5$ to fulfill the facility resource request.

It is also noted that the detailed Day and Time slot information is not given after the time node T, only generic node denotation such as ($D_{akc1}$, $t_{akc1}$) is given, where the sub-scripted notation akcz (z=1 to 4) denotes the possible assignment cluster $PACL^{ak}_z$ for activity $a_k$. This is because the common available time periods (CATPs) depend very much upon the specific time space that is associated with the possible assignment cluster, which was described with FIG. 6.

The timetabling system 10 uses the storage medium to remember all the possible assignment clusters 450 that include trail density deposited. The timetabling engine 16 shown in FIG. 1 will search for the optimal assignment cluster among the possible assignment clusters 450 to fulfill the resource requirements and to satisfy the constraints imposed.

Although there are several possible assignment clusters in the graph cluster 430, at the end of the solution searching cycles, which are carried out by the cooperating agents, a final confirmed assignment cluster will be determined and stored in the activity node 402. The final confirmed assignment cluster is the timetable solution, which is one of the possible assignment clusters, also shown as an assignment cluster 440 in FIG. 8. The only difference is that the assignment cluster does not store trail density.

To illustrate the timetable solution on resource allocation, an example of confirmed assignment cluster is given in FIG. 8. The confirmed assignment cluster stores the information that indicates how the activity node $a_k$ 410 is linked to, or assigned with other resource nodes and time node. For example, the final assignment cluster that is associated with the activity $a_k$ 410, starts from the participant group node $R_1$ 414, which is virtual node as there is no information processing and decision-making required on this node because the participant groups for an activity are often fixed; and next the assignment cluster link goes to another virtual node, staff node $R_2$ 416, and then to resource node $s_3$ 418, noting that the link to $s_3$ 418 is marked with a bold line to indicate this is confirmed assignment. Next the assignment cluster link goes to virtual node $R_{Nr}$ 420, and resource type node $f_{g1}$, 422, and resource node $f_6$ 424b, then back to the virtual node T 426, and finally to the time node $D_2$ 428a, and time slot $t_{ak}$ 428b.

The above description also illustrates the solution-searching path in the source graph 300 displayed in FIG. 7. Therefore, the trail density $\tau^{ak}_z$ is stored in each of possible assignment clusters 450 respectively, where the z represents the index of the possible assignment cluster and $a_k$ is referring to said activity. The pheromone density $\tau^{ak}_z$ deposited on the solution-searching path will be used in local searching for probability-based decision-making together with hybrid heuristics, details of which will be described hereinafter.

Referring now again to FIG. 8, a cooperating agent object 408 that is associated with a cooperating agent 412 is shown. The agent object 408 identifies the cooperating agent 412 via an agent object ID and name. The cooperating agent object also has a list of scheduled activity IDs, and a list of chosen possible assignment IDs that represent list of the confirmed assignment clusters. The agent object 408 does not store detailed information about the list of activity nodes and list of the confirmed assignment clusters, which are stored in a common storage because the list of activity nodes is generic to all cooperating agents. During a searching cycle, the cooperating agent 412 updates the trail density stored on the possible assignment clusters. The information on possible assignment clusters and trail density are again stored in a common storage for all cooperating agents to use.

It is noted that the trail density deposited on each of the possible assignment clusters will be refreshed (cleared) after one searching cycle is completed. It is also noted that the activity node not only states the timetabling problem, e.g., specification of the activity and resource requirements and constraints imposed on the activity; but also contains a solution to the requirements by including a confirmed assignment cluster which consists of the resources allocated and start time scheduled.

As shown in the FIG. 7, the timetable solution searching by a cooperating agent in the present invention starts from an initial activity node $a_1$ 302 to the last activity node $a_n$ 328 in the ranked activity list 330. For each activity (e.g., $a_k$) as shown in FIG. 8, the cooperating agent starts to assign the resources ($R_1$ 414, $R_2$ 416, and $R_{Nt}$ 420), and to schedule a start time (node T 426, time node $D_2$ 428a and $t_{ak}$ 428b).

Figure 9:
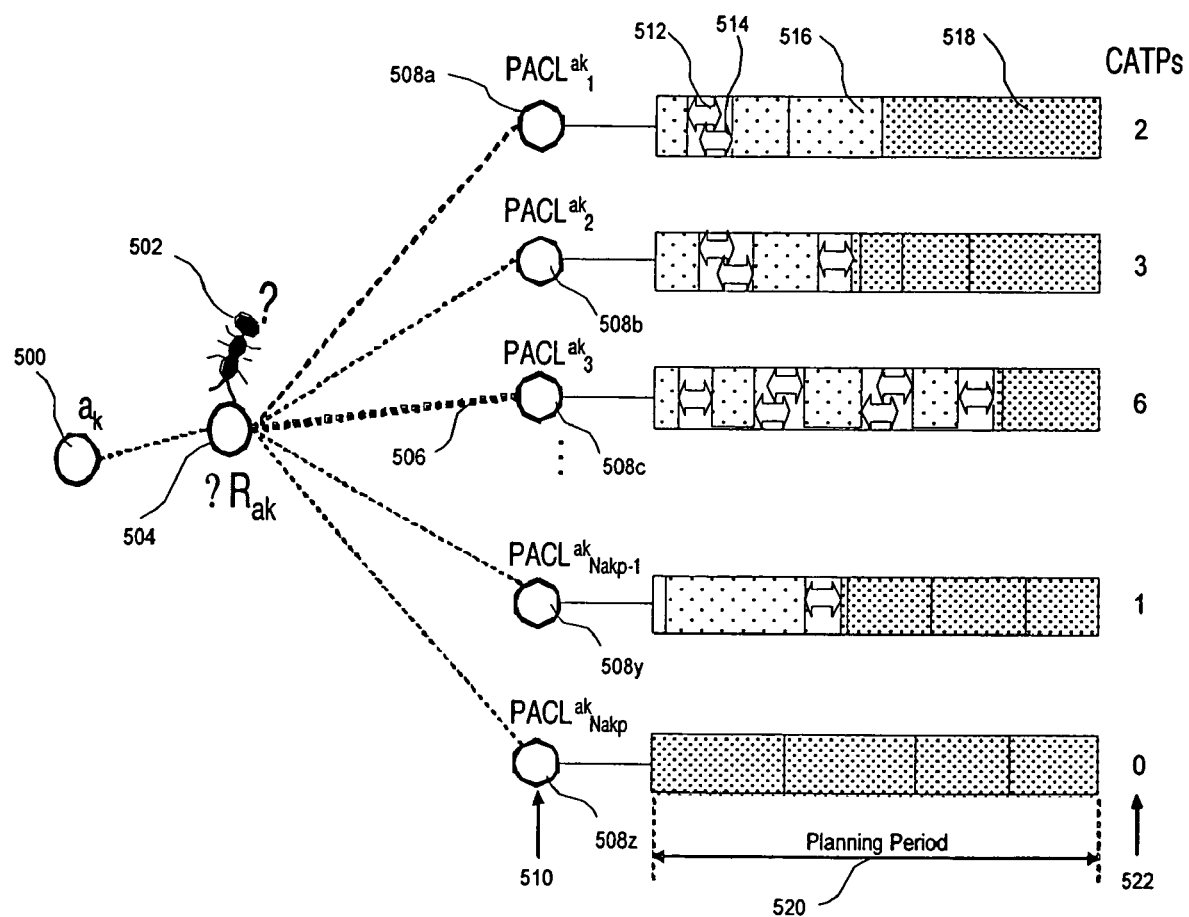
FIG. 9 illustrates a local searching heuristic used by pheromone and heuristics based cooperating agents to select a possible assignment cluster for the activity $a_k$, according to common available time periods (CATPs) analysis and hybrid heuristics used in the timetabling system of FIG. 1.

Now there is provided a detailed description of the local search for finding a next resource combination node in accordance with one preferred embodiment of the present invention. Referring now to FIG. 9, at time t, a cooperating agent 502 comes from an activity node $a_k$ 500 and then to the virtual resource node $\Sigma R_{ak}$ 504. According to the resource requirements illustrated in FIG. 8, there are $N^{ak}_p$ possible assignment clusters that represent all the possible resource assignment combinations that can meet the specified resource requirements specified in the activity object, in particular when discrete resource is required. FIG. 9 illustrates a list of the possible resource assignment clusters 510 for activity $a_k$ 500, namely $PACL^{ak}_z$ (z=1 to $Nr^{ak}_p$, where $Nr^{ak}_p$ is the number of possible assignment clusters for activity $a_k$). The cooperating agent 502 will use the method described in FIG. 6 to find out the common available time periods (CATPs) 522 for each of all the possible assignment clusters. For example, the possible assignment cluster $PACL^{ak}_1$ 508a has two CATPs, namely the CATP 512, and CATP 514; and the possible assignment cluster $PACL^{ak}_2$ 508b has three CATPs. Note that when analyzing the CATPs, the cooperating agent considers the whole planning period 520, which consists of $N_t$ time slots. Similarly, the time slot marked using spare dots 516 has already been scheduled by the timetabling system 10, and the period marked using dense dots was booked for other purpose by the planner via the interface 12 in FIG. 1.

As shown in FIG. 9, the cooperating agent that has gone through the resource allocation and time scheduling cycles deposits some pheromone on the searching path 506. The trail density is stored in the possible assignment cluster object 450 shown in FIG. 8. There are $N^{ak}_p$ possible resource assignment clusters 508a, 508b, . . . , 508y and 508z that are virtually linked to the virtual node 504. The searching agent 502 chooses a possible resource assignment cluster node based on a probability function, e.g., $P^{ak}_z=f(\tau^{ak}_z, CATP_z, CS^{ak}_z)$. The probability function depends on following parameters:

a) $\tau^{ak}_z$ is the amount of trails present on a link that is sometimes referred in the possible resource assignment cluster in FIG. 8;

b) the number of CATPs available and location of the CATP within the planning period; and c) the evaluation of constraints imposed, $CSr^{ak}_z$, including generic constraints which are imposed to all activities and specific constraints which are imposed to this activity only.

In order to select a desirable possible resource assignment node, a desirability factor $qr^{ak}_z$ (z=1 to $N^{ak}_p$) is defined as follows:

$$q^{a_k}_z = \begin{cases} \tau^{a_k}_z + CSr^{a_k}_z & \text{if } CATPs \text{ returned} \\ 0 & \text{otherwise} \end{cases} \quad (2)$$

In Equation (2), $\tau^{ak}_z$ is the pheromone density deposited on the possible assignment cluster $PACL^{ak}_z$, $CSr^{ak}_z$ is the quantitative evaluation of the resource constraints imposed on the activity $a_k$, which is calculated as follows:

$$CSr^{a_k}_z = \sum_{i=1}^{Nr^{ak}_{cs-r}} f(CSr_i) \times Wr_i \quad (3)$$

In Equation (3), the evaluation value of $f(CSr_i)$ is 1 if the resource constraint $CSr_i$ is satisfied, otherwise of $f(CSr_i)$ is 0; $Wr_i$ is weight factor for constraint $CSr_i$; the $Nr^{ak}_{cs-r}$ is the number of resource related constraints imposed on the timetabling problem of the particular activity $a_k$.

The pheromone density $\tau^{ak}_z$ deposited on the possible assignment cluster $PACL^{ak}_z$ is initially set to a small decimal number, say 0.01, when a searching agent completes its searching cycle, the pheromone density is updated according to the quality of the solution searched. Detailed information on updating the pheromone density is given later on.

With all the equations given, e.g., Equation (1), (2), and (3), the probability for selecting a possible resource assignment cluster can be calculated using following equation:

$$pr^{a_k}_z = \left(\frac{qr^{ak}_z}{qr^{ak}_{sum}}\right) \times 100\% \quad (4)$$

In Equation (4), the value of $qr^{ak}_{sum}$ is computed as follows:

$$qr^{a_k}_{sum} = \sum_{i=1}^{Nr^{a_k}_p} qr^{a_k}_i \quad (5)$$

When all cooperating agents have completed construction of their respective timetable solutions in one timetable solution searching cycle, the trail intensity $\tau^{ak}_z$ is updated using the following:

$$\tau^{ak}_z(t+\Delta t) = \rho \cdot \tau^{ak}_z(t) + \Delta \tau^{ak}_z \quad (6)$$

$\Delta \tau^{ak}_z$ is calculated using the following:

$$\Delta \tau^{a_k}_z = \sum_{h=1}^{m} (\Delta \tau^{a_k}_z)_h \quad (7)$$

In equation (7), $(\Delta \tau^{ak}_z)_h$ is quantity of trail substance per unit of length (pheromone in real ants) laid on the possible assignment cluster by $Agent_h$ between time t and t+Δt. It is noted that there are m cooperating agents. The value of $(\Delta \tau^{ak}_z)_h$ is given by:

$$(\Delta \tau^{a_k}_z)_h = \begin{cases} \left(\sum CS^{a_k}_z + \sum OP^{a_k}_z\right)_h \times C_{ts} & \text{if } PACL^{a_k}_z \in \text{ valid timetable solutions} \\ 0 & \text{otherwise} \end{cases} \quad (8)$$

where, the element $(\Sigma CS^{ak}_z + \Sigma OP^{ak}_z)_i$ is evaluated using equations similar to Equation (3), the index i stands for the $Agent_i$, $\Sigma CS$ is a quantitative global measurement of constraint satisfaction of the timetable solution searched by the $agent_i$, $\Sigma OP$ is a quantitative global measurement of optimization criteria achieved by the timetable solution searched by the $agent_i$; $C_{ts}$ is a constant which is initialised at beginning stage of the timetable searching process.

Figure 10:
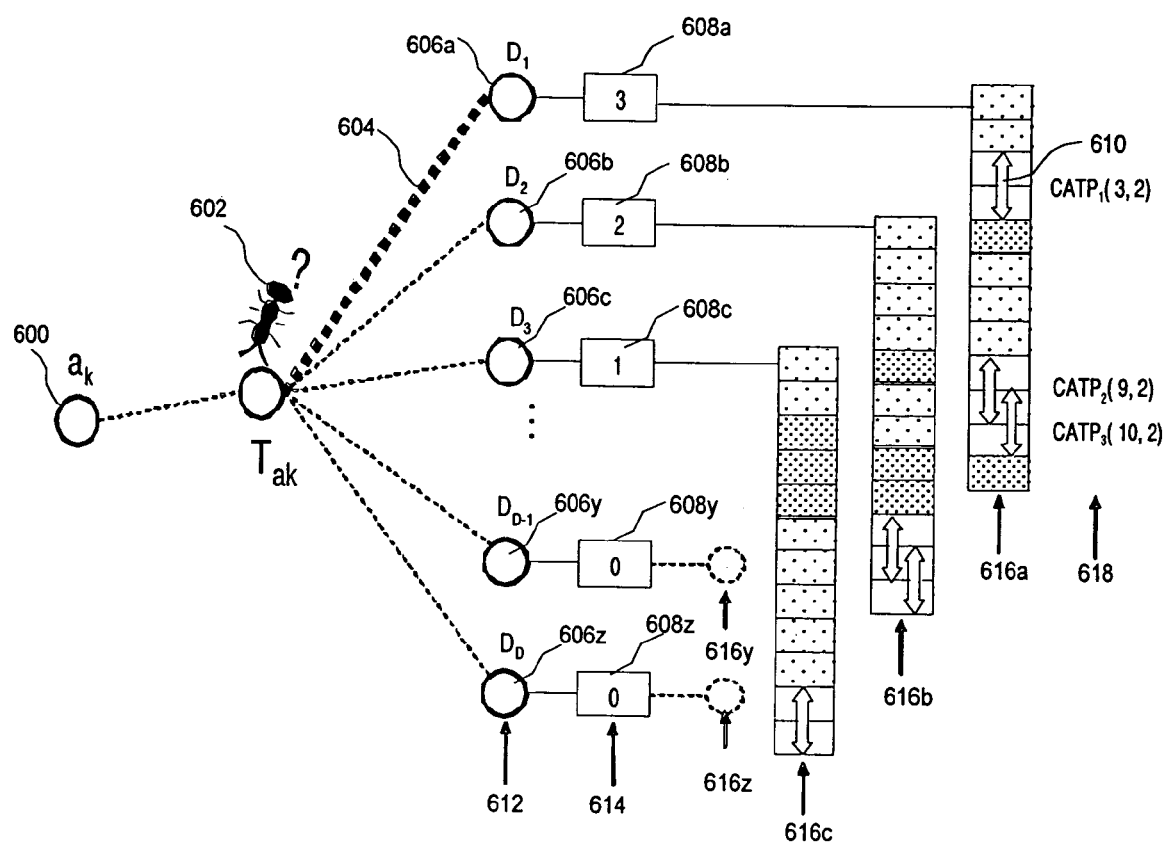
FIG. 10 illustrates a local searching heuristic used by pheromone and heuristics based cooperating agents to select the CATP as start time for the activity $a_k$, in the timetabling system of FIG. 1.

Referring now to FIG. 10, the cooperating agent 600 then comes to the virtual time node $T_{ak}$ 602. The cooperating agent needs to pick up a CATP among all the CATPs returned by the chosen possible assignment cluster, say $PACL^{ak}_3$ 508c, from previous step described in FIG. 9.

As mentioned before, the CATPs returned from the previous step in FIG. 9 initially are distributed within the whole planning period. Now the system needs to distribute all the returned CATPs into D days 612 accordingly. For example, referring to FIG. 9 again, if the cooperating agent 502 selected the possible assignment cluster, say $PACL^{ak}_3$ 508c, then there will be six CATPs returned to the current time node selection stage. As shown in the FIG. 10, the six CATPs 614 are distributed into D days, namely, 3 CATPs 608a in $D_1$ 606a, 2 CATPs 608b in $D_2$ 606b, and 1 CATP 608c in $D_3$ 606c, as shown in FIG. 10. The list of time slots including CATPs returned for each day is illustrated in FIG. 10 by the list 616a, 616b, 616c, 616y and 616z respectively. It can been seen from the FIG. 10 that the Day $D_{D-1}$ and Day $D_D$ do not have any CATP returned, namely the time slot lists of the day node $D_{D-1}$ 606y and the day node $D_D$ 606z are fully occupied.

Similar to the resource allocation, the probability function used to choose an optimal CATP from which the start time for activity $a_k$ is derived depends on following parameters:

a) $\tau^{ak}_y$ is the amount of trails present on a link from the virtual node $T_{ak}$ to the CATPs (time nodes) shown in FIG. 10;

b) the number of CATPs available and location of the CATP within the planning period; and c) the evaluation of time schedule related constraints imposed, $CSt^{ak}_y$, including generic constraints which are imposed to all activities and specific constraints which are imposed to this activity only.

Again, in order to select a desirable time node, a desirability factor $qt^{ak}_y$ (y=1 to $Nt^{ak}_{tn}$) is defined as follows:

$$qt_y^{a_k} = \begin{cases} T_y^{a_k} + CSt_y^{a_k} & \text{if } CATP \text{ exists} \\ 0 & \text{otherwise} \end{cases} \quad (9)$$

In Equation (9), $Nt^{a_k}_{tn}$ is the number of CATPs returned by the chosen possible assignment cluster; and $CSt^{a_k}_y$ is the quantitative evaluation of the time related constraints imposed on the activity $a_k$, which is calculated as follows:

$$CSt_y^{a_k} = \sum_{i=1}^{Nt_{cs-t}^{a_k}} f(CSt_i) \times Wt_i \quad (10)$$

Similarly, in Equation (10), the evaluation value of $f(CSt_i)$ is 1 if the constraint $CSt_i$ is satisfied, otherwise of $f(CSt_i)$ is 0; $Wt_i$ is weight factor for constraint $CSt_i$; the $Nt^{a_k}_{cs-t}$ is the number of time related constraints (namely temporal constraints) imposed on the timetabling problem and on this particular activity $a_k$.

With Equation (9) and (10), the probability for selecting a CATP, from which the start time for the scheduled activity $a_k$ can be derived, can be calculated using following equation:

$$pt_y^{a_k} = \left(\frac{qt_y^{a_k}}{qt_{sum}^{a_k}}\right) \times 100\% \quad (11)$$

In Equation (11), the value of $qt^{a_k}_{sum}$ is computed as follows:

$$qt_{sum}^{a_k} = \sum_{i=1}^{Nt_{tn}^{a_k}} qt_i^{a_k} \quad (12)$$

In the Equation (12), $Nt^{a_k}_{tn}$ is the number of CATPs (time nodes) returned by the chosen possible assignment cluster $PACL^{a_k}_c$ for the activity $a_k$. It is noted that although the link from the virtual node $T_{a_k}$ to each time node (e.g., day and time slot) is not illustrated in FIG. 10 for simplification purpose, the trail density is deposited on the chosen possible assignment cluster $PACL^{a_k}_c$ for every activity $a_k$, so that $PACL^{a_k}_c$ includes the information of time node decided, as shown by the possible assignment object 450 in FIG. 8.

Figure 11:
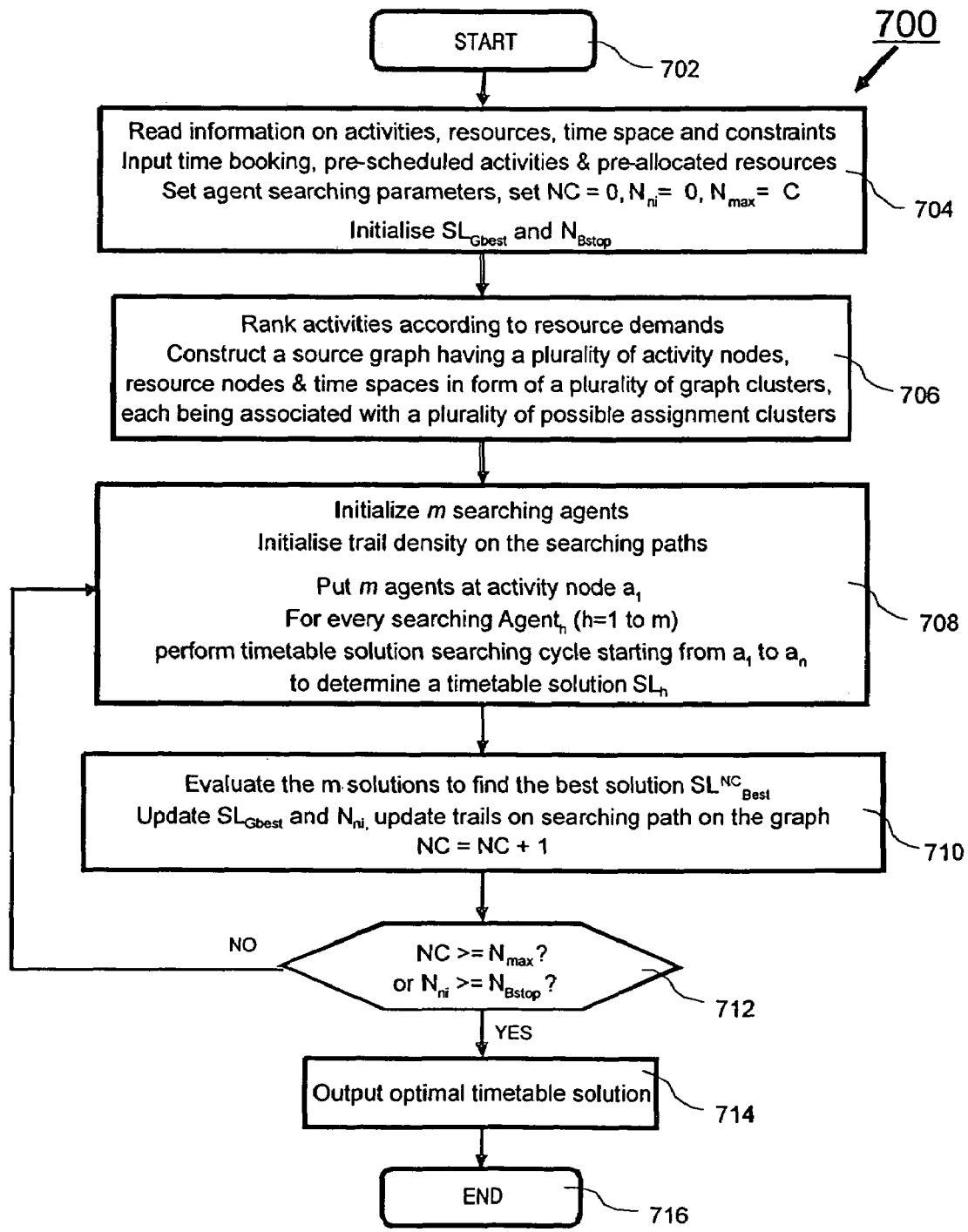
FIG. 11 is a general flowchart of a method of timetabling by the timetabling system of FIG. 1 using pheromone and hybrid heuristics based cooperating agents.

Referring now to FIG. 11, there is provided a general flowchart of a method 700 of timetable solution searching by using the timetabling system 10 in accordance with one embodiment of the present invention. In particular, the method 700 is described using pheromone and hybrid heuristics based cooperating agents. After starting 702, the timetabling system will read/receive timetabling problem definition data including the information on activities, resources, time space and constraints 704.

At the same time 704, the timetabling system initializes one or more searching parameters for one or more searching agents. It also defines NC, $N_{max}$, $N_{ni}$, $SL_{Gbset}$ and $N_{Bstop}$ as searching parameters, where $SL_{Gbset}$ is used to store a best timetable solution searched by cooperating agents; while $N_{Bstop}$ is used to stop the timetable solution searching cycling if the timetable solution searched by the cooperating agents does not improve after $N_{Bstop}$ cycles. The parameter NC is the solution searching cycle counter which is initialized to zero, and $N_{ni}$ is a counter used to store the number of cycles after which the $SL_{Gbset}$ is not improved, $N_{ni}$ is also initialized to zero at this point of time. Another searching parameter, $N_{max}$, which is the maximum number of cooperating agent search cycles repeated, is also initialized.

Referring still to FIG. 11, after initialization, the timetabling system will proceed to step 706 in which it ranks all the activities according to their resource demands. The graph generator 14 in FIG. 1 retrieves data associated with a plurality of activity nodes, a plurality of resource nodes and a plurality of time nodes from the storage medium 20a. Each of said plurality of activity nodes is associated with its required resource objects. Then the graph generator constructs a source graph having said plurality of activity nodes, said plurality of resource nodes & said plurality of time spaces. Said source graph has a plurality of graph clusters, each graph cluster being associated with a plurality of possible assignment clusters which are associated with each of said activity nodes.

The timetable solution searching for all the cooperating agents begins from the first activity node $a_1$ in the ranked activity list in the graph 300 constructed by the constructor generator 14. The total number of cooperating agents is denoted as m.

The timetabling system 10 then proceeds to perform timetable solution searching cycles in step 708 on the source graph for the pheromone and hybrid cooperating agents to determine a best timetable solution. In this module 708, the m searching agents are created and initialized, and the trail density on the searching paths in the multiple resource-time space is initialized, e.g., the trail density previously deposited on the searching paths in the possible assignment clusters is cleaned so that another searching cycle can be carried out in a fresh environment without influence from previous searching cycles.

The module 708 then places the m searching agents at the first activity node $a_1$ of the ranked list of activity nodes. Each of the cooperating agent performs a complete timetable solution searching cycle starting from the first activity node $a_1$ to the last activity node $a_n$, where n is the number of activities in the ranked activity list 310 on the source graph 300 shown in FIG. 7. The solution searched by the cooperating agent, say Agent$_h$, in searching cycle N is denoted as $SL^N_h$.

After all the m agents complete their timetable solution searching, the method 700 proceeds to step 710 to evaluate the m solutions searched and find the best solution in searching cycle N, wherein said best solution is denoted as $SL^N_{best}$. If the $SL^N_{best}$ is better than the global best solution, denoted as $SL_{Gbest}$, searched so far, the system updates the global best solution, and sets $N_{ni}$ to zero. At end of the step 710, the searching cycle counter N is incremented by one.

In checking step 712 in FIG. 11, whether the timetable solution searching cycle will continue depends upon if the searching cycling counter NC is equal or larger than $N_{max}$, or if the counter $N_{ni}$ is equal or larger than $N_{Bstop}$. With a "NO" the timetable solution searching method 700 returns to step 708. Otherwise, with a "YES", the timetable solution searching method proceeds to next step 714 to output the timetable solution, and then comes to the end 716 of the solution searching procedure.

Figure 12:
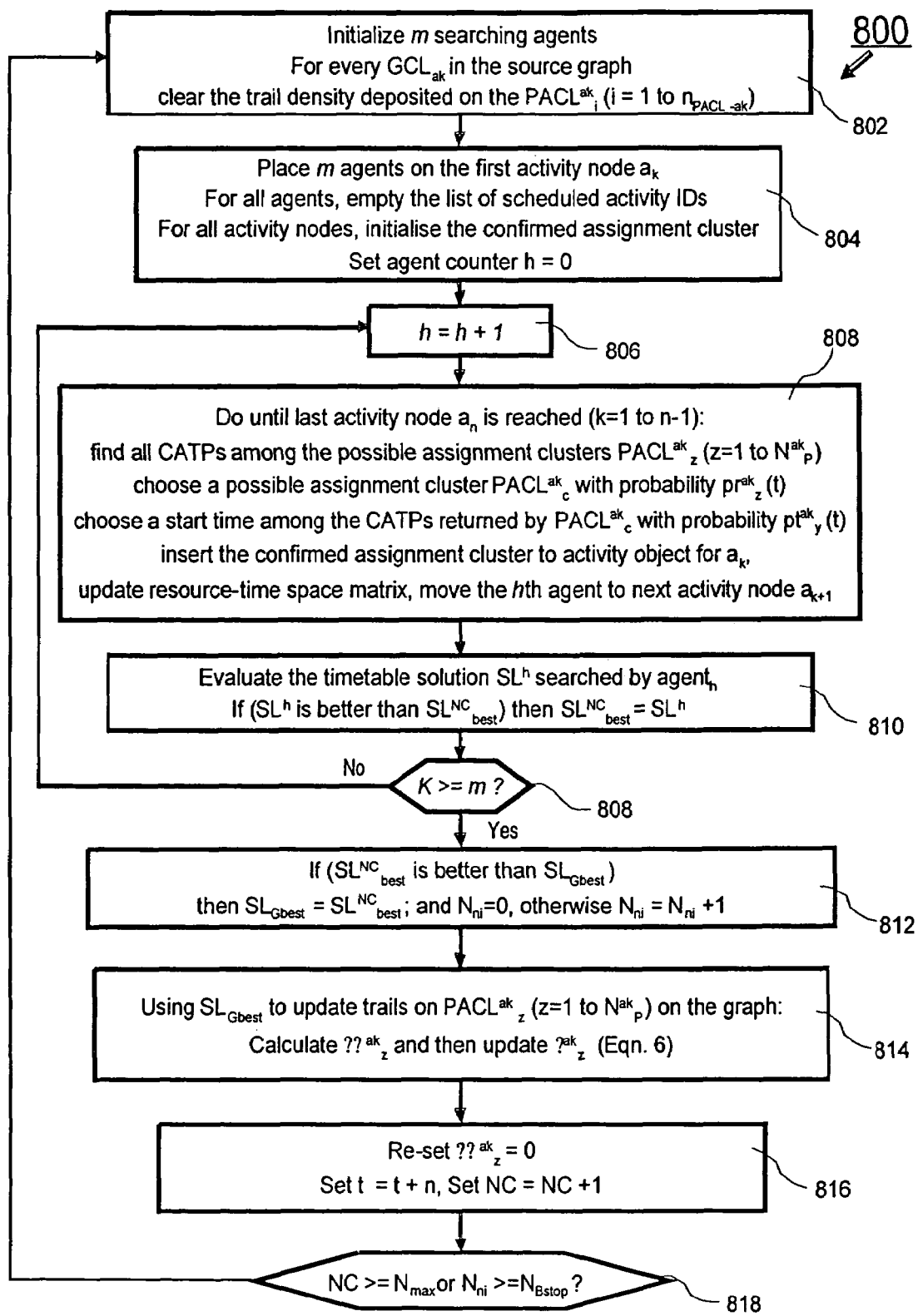
FIG. 12 is a detailed flowchart of a timetable solution searching cycle module and solution evaluation module within the method of FIG. 11.

Now there is provided a more detailed description in FIG. 12 of the timetable solution searching cycle module 708 and solution evaluation module 710 in the method 700 briefly discussed above. As shown in FIG. 11 and FIG. 12, the step 708 starts with the initializing step 802 by creating and initializing the predetermined number of cooperating agents, namely allocating memory space for predetermined number of cooperating agent objects 408, and emptying their lists of scheduled activity IDs and lists of confirmed assignment cluster IDs too.

The initializing step 802 includes initializing the trail density on the searching paths previously traveled by the searching agents in the previous searching cycle. In this invention, the trail density are deposited by the searching agents on the possible assignment clusters $PACL^{ak}_z$ (z=1 to $N^{ak}_p$) for every graph cluster $GCL^{ak}$ in the source graph 300, namely $\tau^{ak}_z = C_\tau$ and $\Delta\tau^{ak}_z = 0$, where $C_\tau = 0.01$; and where $\tau^{ak}_z$ denotes the pheromone density deposited on the possible assignment cluster $PACL^{ak}_z$. The possible assignment clusters $PACL^{ak}_z$ (z=1 to $N^{ak}_p$) are associated with activity $a_k$ (k=1 to n).

The timetable solution searching cycle module 708 proceeds to step 804 placing predetermined number of cooperating agents (m) at the first activity node 302 of the ranked activity list in the source graph 300, and empty the list of scheduled activity IDs for every cooperating agent. At this step, the confirmed assignment cluster, which is included in the activity node, is initialized to null and the agent counter h is set to zero.

Step 806 increments the agent counter h by one.

Again referring to FIG. 12, a timetable solution searching cycle is carried out by the $Agent_h$. The timetable solution searching cycle starts with finding all CATPs among the possible assignment clusters $PACL^{ak}_z$ (z=1 to $N^{ak}_p$). Thereafter, the timetable solution searching cycle module 708 continues with choosing in step 808 an optimal possible assignment cluster $PACL^{ak}_c$ based on the probability function $Pr^{ak}_z$ of Equation (4) for the activity $a_k$, where k is an index indicating current activity node. Then the timetable solution searching cycle module 708 continues with choosing a start time among a number of CATPs returned from the chosen possible assignment cluster $PACL^{ak}_c$ based on the probability function $Pt^{ak}_z$ of Equation (11) for activity $a_k$. Next, the searching cycle module 708 inserts the chosen possible assignment cluster denoted as $PACL^{ak}_c$ together with the chosen start time node as the confirmed assignment cluster into the activity node object. Finally the solution searching module 708 updates the centre resource-time space, such as staff-time space 80 which is illustrated in FIG. 3.

It is noted that choosing the optimal assignment cluster is repeated in a loop for a while until the last activity node $a_n$ is assigned with required resources and scheduled with a start time.

Upon choosing in step 808 the confirmed assignment clusters for all activities, the timetable searching cycle module 708 evaluates, according to hard and soft constraints imposed and optimization criteria specified, in step 810 the timetable solution $SL^h$ searched by $Agent_h$. If the solution $SL^h$ is better than the solution $SL^{NC}_{best}$ searched in this searching cycle (counter=NC), then the searching module 708 updates $SL^{NC}_{best}$ by assigning $SL^h$ to $SL^{NC}_{best}$. It is noted that at end of the searching cycle of the first searching agent, e.g., the searching $Agent_1$, the $SL^{NC}_{best}$ and $SL_{GBest}$ are both initialized by using $SL^1$, although $SL^{NC}_{best}$ and $SL_{GBest}$ may be updated later on due to that some better solution might be found by subsequent searching agents.

In checking step 808 in FIG. 12 whether all the agents have completed their solution searching cycles determines whether the current searching cycle indexed by NC is finished. With a "NO" the timetable searching cycle module 708 returns to step 806 to let next searching agent to carry out its searching cycle. Otherwise, with a "YES", the timetable searching cycle module 708 proceeds to next step 812.

In step 812, the timetable evaluation module 710 compares $SL^{NC}_{best}$ with the global best path $SL_{GBest}$ searched so far and updates $SL_{GBest}$ with $SL^{NC}_{best}$ if $SL^{NC}_{best}$ is better than $SL_{GBest}$. In this situation, a counter ($N_{ni}$) for timetable searching cycles in which there is timetable solution improvement is initialized by setting $N_{ni}=0$. Otherwise, the counter $N_{ni}$ is incremented by one to denote that one timetable solution searching cycle has been performed with no solution improvement.

Referring again to FIG. 12, and after step 812, the timetable evaluation module 710 continues to calculate trails $\Delta\tau^{ak}_z$ and update trail density $\Delta\tau_z$ on $PACL^{ak}_z$ (z=1 to $N^{ak}_p$) on the source graph, where density $\Delta\tau_z = \Delta\tau_z + \Delta\tau^{ak}_z$. Further the evaluation module 710 computes and updates density trails $\tau^{ak}_z$ (t+$\Delta$t) on every $PACL^{ak}_z$ (z=1 to $N^{ak}_p$), and then sets $\Delta\tau^{ak}_z = 0$, as well sets time t=t+$\Delta$t, and searching cycle counter NC=NC+1.

The timetable evaluation module 710 continues to determine in step 818 whether searching cycle is finished. For a "NO", the timetable searching module 708 and evaluation module 710 return to step 802 to carry on another searching cycle. Otherwise, if either the best timetable has no improvement after $N_{Bstop}$ cycles such as when $N_{ni} \geq N_{Bstop}$ or if the total number of timetable searching cycles reaches $NC_{max}$ (when $NC \geq NC_{max}$), then the timetable searching cycle module and evaluation module 710 stops, and the timetable solution is presented at step 714 in FIG. 11.

Figure 13:
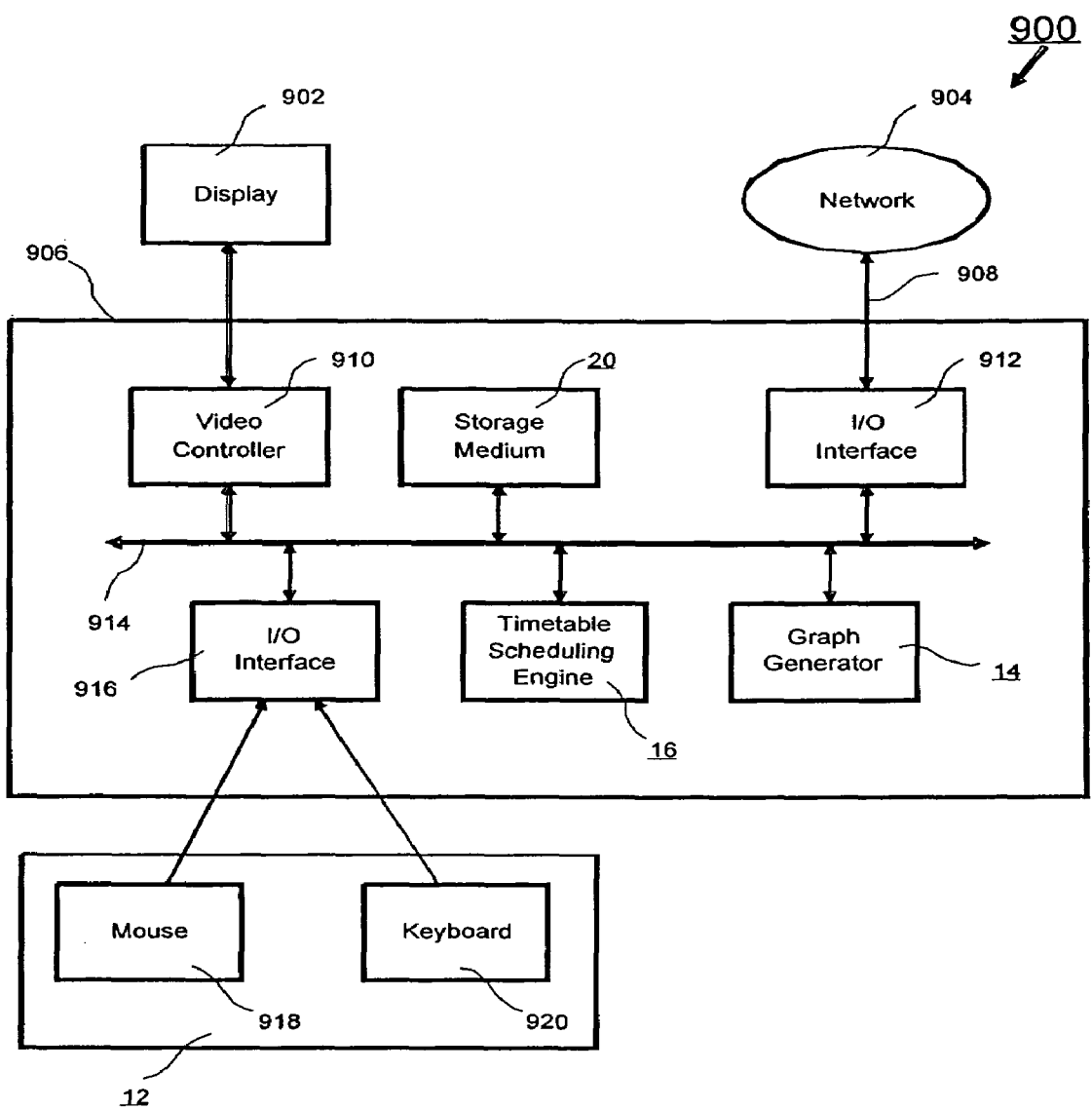
FIG. 13 shows an exemplary configuration of a computer system for executing the method of FIG. 1.

The method 700 can be executed via a computer program that is recorded on computer usable medium. Such computer usable medium may include random access memories (RAMs), read-only memories (ROMs), hard disks, and different types of compact discs or floppy disks. A product that comprises the computer program recorded on computer usable medium can be executed with, for example, a computer system 900 as illustrated in FIG. 13.

The computer system 900 can be, for example, a server when the timetable solution searching system 10 is implemented as a client-server system with different access rights for different users. As a server, the computer system 900 can be coupled via a communication resource 908 to a network 904 such as, for example, an Intranet or the Internet. The computer system 900 comprises a computer 906 that includes the storage medium 20 and the timetabling engine 16. Typically, the computer 906 has, for example, an intelligent data processor that supports the functions of the timetabling engine 16. The storage medium 20 can serve as the computer usable medium with the computer program recorded thereon. In this case, the storage medium 20 can be one or more memory devices such as random access memories (RAMs), read-only memories (ROMs), or hard disks. Alternatively, the storage medium 20 can be a memory device reader such as, for example, a compact disc drive or a floppy disk drive. Such a memory device reader enables access to the computer program by the timetabling engine 16.

The display 902 is coupled to the timetable solution searching engine 16 via a video controller 910. Data flow within the computer 906 is by means of a data bus 914 that couples the video controller 910, the graph generator 14, the timetabling engine 16, the storage medium 20, and an input/output (I/O) interface 912. The user input interface 12, comprising a mouse 918 and a keyboard 920, couples to the data bus 914 via another I/O interface 916.

The present invention therefore provides the timetabling system 10, the method 700, and the product that comprises the computer program for executing the method 700 by the timetabling system 10 to overcome, or at least alleviate, the problems of the prior art.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A timetabling system based on an improved an colony optimization using pheromone and hybrid heuristics based cooperating agent, wherein the timetabling system can provide an optimal timetable for a timetable problem requiring a plurality of activities be scheduled within a planning period with a plurality of time slots of which each time slot has a start time, said timetabling system comprising:

an electronic device having a memory capacity that contains a storage medium, wherein the storage medium stores the information of the timetable problem including the plurality of activities, the time slots within the planning period, and the plurality of sets of resources; and wherein the electronic device is embedded with a timetabling module that generates optimal timetable using the information inputted from a user;

wherein the timetabling module comprises a source graph constructor for constructing the source graph for the timetable problem; wherein the source graph consists of a plurality of activity nodes representing the activities, a plurality of resource nodes representing the resources, and a plurality of time nodes representing the time slots that are associated with the plurality of resource nodes, thereby the plurality of resource nodes and the time nodes form a multi-resource-time-space, i.e., the source graph; and wherein the timetabling module further comprises a timetable solution searching engine performing timetable solution searching cycles on the source graph based upon local searching heuristic rules and global pheromone updating rules by pheromone and hybrid heuristics based cooperating agents to thereby generate an optimal timetable;

wherein said electronic device provides said generated optimal timetable for use by the user; said generated optimal timetable having each activity being scheduled to one or more time slots within the planning period and being allocated with all required resources.

2. The timetabling system of claim 1, wherein the local searching heuristic rules include a probability function of resource by which the searching agents choose a possible resource assignment cluster, wherein the probability function of resource may be represented by $p^{ak}_z = f(\tau^{ak}_z, CATP_z, CSr^{ak}_z)$; wherein each possible assignment cluster in indexed as z, $\tau^{ak}_z$ is the amount of trails present on a link, $CATP_z$ reflects the number of CATPs available and location of the CATP within the planning period, and $CSr^{ak}_z$, the evaluation of constraints imposed, including generic constraints which are imposed to all activities and specific constraints which are imposed to this activity only; and a probability function of time by which the searching agents choose an optimal CATP from which the start time for activity $a_k$ is derived, wherein the probability function of time may be represented by $p^{ak}_y = f(\tau^{ak}_y, CATP_y, CSt^{ak}_y)$; wherein $\tau^{ak}_y$ is the amount of trails presented on a link from the vitrual node $T_{ak}$ to the CATPs, $CATP_y$ reflects the number of CATPs available and location of the CATP within the planning period, and $CSt^{ak}_y$, the evaluation of time schedule related constraints imposed, including generic constraints which are imposed to all activities and specific constraints which are imposed to this activity only.

3. The timetabling system of claim 1, wherein the source graph comprises a plurality of graph clusters, wherein each graph cluster is comprised of an activity node, a plurality of resources nodes, and a plurality of time nodes that are associated with the activity node and the resources nodes.

4. The timetabling system of claim 3, wherein each of the graph clusters comprises a plurality of possible assignment clusters, each of the possible assignment clusters representing a combination of resource allocation and time node scheduling arrangement for the activity of the graph cluster.

5. The timetabling system of claim 1, wherein the source graph constructor comprises an editor for editing the information required for the construction of the source graph, the information including constraints, time slot booking and prescheduled activities associated with the plurality of activity nodes, the plurality of resource nodes and the plurality of time nodes.

6. The timetabling system of claim 1, wherein the source graph constructor comprises a solution search definer for defining one or more criteria for the timetable solution searching cycles and activating one or more constraints being imposed for timetable solutions.

7. The timetabling system of claim 1, wherein the hybrid heuristics comprise:
activity ranking heuristic;
multiple resource-time-space manipulation heuristic;
constraint based reasoning;
probability based decision-making; and
optimization heuristic.

8. The timetabling system of claim 7, wherein the activity ranking heuristic may be used for ranking the plurality of activity nodes so that the most difficult activity is scheduled first, thereby the activity nodes are listed in a ranked order in the source graph.

9. The timetabling system of claim 7, wherein the multiple resource-time-space manipulation heuristic may be used for analysing available time periods for said activity.

10. The timetabling system of claim 7, wherein the multiple resource-time-space manipulation heuristic may be used for analyzing common available time periods among a plurality of resources required by one of said plurality activities.

11. The timetabling system of claim 1, wherein the local searching heuristic comprises:
a trail intensity factor;
a common available time period factor; and
a constraint evaluation factor.

12. The timetabling system of claim 11, wherein the constraint evaluation factor is based on the satisfaction level of one or more constraints imposed on the timetabling problem.

13. The timetabling system of claim 11, wherein the trail intensity factor, the common abailable time period factor and the constraint evaluation factor are adapted in a probability function for the searching agent to choose an optimal possible assignment cluster for the activity.

14. The timetabling system of claim 1, wherein the timetable soltuion searching engine is further adapted to provide m pheromone and hybrid cooperating agents for searching timetable soltuions; wherein the pheromone and hybrid cooperating agents search for the optimal timetable solution on the source graph based on the probability function.

15. The timetabling system of claim 1, further comprising a user input interface that allows the user to input information that specifies the time table problem; wherein the information includes details of the activities, the resources requirements, constraints, and one or more optimisation criteria for the timetable solution.

16. A timetabling method based on an improved ant colony optimisation by using pheromone and hybrid heuristics based cooperating agents to obtain an optimal timetable for a timetable problem, wherein the timetable problem requires that a plurality of activities be scheduled within a planning period with a plurality of time slots of which each time slot has a start time, said timetabling method comprising:

constructing a source graph having a plurality of activity nodes representing the activities, a plurality of resource nodes representing the resources, and a plurality of time nodes representing the time slots that are associated with the plurality of resource nodes, thereby the plurality of resource nodes and the time nodes form a multi-resource-time-space, i.e., the source graph;

initializing one or more searching parameters for one or more pheromone and hybrid heuristics based cooperating agents;

performing timetable solution searching cycles on said source graph based upon local searching heuristic rules and global pheromone updating rules by the pheromone and hybrid heuristics based cooperating agents to determine generate the optimal timetable; and providing said generated optimal timetable to the user; said generated optimal timetable having each activity being scheduled to one or more time slots within the planning period and be allocated with all required resources.

17. The timetabling method of claim 16, wherein said step of constructing the source graph comprises:

retrieving data associated with said plurality of activity nodes, said plurality of resources nodes and said plurality of time nodes;

constructing said source graph, said source graph having a plurality of graph clusters, each of said graph clusters is associated with one of said plurality activity nodes, each of said graph cluster having a plurality of possible assignment clusters; and identifying said constraints that are activated.

18. The timetabling method of claim 16, wherein said initializing step comprises defining a predetermined number of cooperating agents.

19. The timetabling method of claim 16, wherein said step of performing search cycles comprises setting a plurality of cycle parameters for searching agents, said plurality of cycle parameters being stored in a common storage medium.

20. The timetabling method of claim 19, wherein said step of performing search cycles further comprises placing a predetermined number of cooperating agents at an initial activity node, said initial node being the first activity node of the ranked activity list.

21. The timetabling method of claim 20, wherein said placing step comprises:

clearing one or more lists of scheduled activity IDs in an agent object, each of said lists of scheduled activity IDs being respectively associated with each of said cooperating agents;

clearing one or more lists of confirmed assignment cluster IDs in the agent object, each of said confirmed assignment cluster IDs representing a timetable solution searched by each of said cooperating agents; and entering said initial activity node ID into each of said list of scheduled activity IDs.

22. The timetabling method of claim 20, wherein said step of performing search cycles further comprises:

selecting a cooperating agent from said searching agents;

choosing a possible assignment cluster for the selected cooperating agent based on a probability function; and repeating said selecting and said choosing for remaining cooperating agents.

23. The timetabling method of claim 22, wherein said repeating step comprises adding said scheduled activity node ID to said list of scheduled activity IDs.

24. The timetabling method of claim 22, wherein said step of performing search cycles further comprises: storing said timetable solution in form of list of the confirmed assignment clusters.

25. The timetabling method of claim 24, wherein said step of performing search cycles further comprises: evaluating said timetable solution to determine whether to update a cycle parameter of said plurality of cycle parameters, said cycle parameter corresponding to a best path for a searching cycle.

26. The timetabling method of claim 25, wherein said step of performing search cycles further comprises: checking whether there is another cooperating agent for the steps of selecting, choosing, and repeating.

27. The timetabling method of claim 26, wherein said step of performing search cycles further comprises: updating trails on the searching paths using quantity of trail substance per unit of length of one or more stored valid timetable solution.

28. The timetabling method of claim 27, wherein said step of performing search cycles further comprises: computing trail intensity for every chosen possible assignment clusters of each of said stored valid timetable solutions searched by m agents.

29. The timetabling method of claim 28, wherein said step of performing search cycles further comprises: outputting said best timetable solution.

\* \* \* \* \*

UNITED STATES PATENT AND TRADEMARK OFFICE
CERTIFICATE OF CORRECTION

PATENT NO. : 7,447,669 B2  Page 1 of 1
APPLICATION NO. : 11/211460
DATED : November 4, 2008
INVENTOR(S) : Chunbao Zhu It is certified that error appears in the above-identified patent and that said Letters Patent is hereby corrected as shown below:

Column 21, line 10, delete the second occurrence of "an" and replace with "ant"

Column 21, line 52, delete "$p^{ak}_z$" and replace with "$P^{ak}_z$"

Column 21, line 63, delete "$p^{ak}_y$" and replace with "$P^{ak}_y$"

Column 21, line 65, delete "vitrual" and replace with "virtual"

Column 22, line 55, delete "abailable" and replace with "available"

Column 22, line 62, delete "soltuions" and replace with "solutions"

Signed and Sealed this

Thirtieth Day of December, 2008

JON W. DUDAS
*Director of the United States Patent and Trademark Office*